(12) United States Patent
Booth, III et al.

(10) Patent No.: US 7,535,856 B2
(45) Date of Patent: May 19, 2009

(54) TECHNIQUES FOR ZERO TOUCH PROVISIONING OF EDGE NODES FOR A VIRTUAL PRIVATE NETWORK

(75) Inventors: Earl Hardin Booth, III, Raleigh, NC (US); William Mark Townsley, Nashville, TN (US); Greg Weber, Knoxville, TN (US); Wei Luo, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 769 days.

(21) Appl. No.: 11/142,768

(22) Filed: Jun. 1, 2005

(65) Prior Publication Data
US 2006/0190570 A1    Aug. 24, 2006

Related U.S. Application Data

(60) Provisional application No. 60/654,661, filed on Feb. 19, 2005.

(51) Int. Cl.
*H04L 12/28* (2006.01)
(52) U.S. Cl. .................... 370/255; 370/395.2; 370/410; 709/219; 709/222; 709/250
(58) Field of Classification Search ........................ None
See application file for complete search history.

(56) References Cited

U.S. PATENT DOCUMENTS

| | | | |
|---|---|---|---|
| 7,197,550 B2* | 3/2007 | Cheline et al. | 709/223 |
| 2003/0110268 A1* | 6/2003 | Kermarec et al. | 709/227 |
| 2003/0110276 A1 | 6/2003 | Riddle | |
| 2003/0217126 A1* | 11/2003 | Polcha et al. | 709/220 |
| 2004/0044789 A1 | 3/2004 | Angel et al. | |
| 2004/0052263 A1 | 3/2004 | Xu | |
| 2005/0097203 A1 | 5/2005 | Unbehagen et al. | |
| 2005/0114490 A1 | 5/2005 | Redlich et al. | |
| 2005/0135269 A1* | 6/2005 | Saint-Hilaire et al. | 370/254 |
| 2005/0193103 A1* | 9/2005 | Drabik | 709/221 |
| 2006/0018300 A1 | 1/2006 | Westberg et al. | |
| 2006/0056384 A1* | 3/2006 | Ishii et al. | 370/351 |

OTHER PUBLICATIONS

J. Heinanen et al., Using Radius for PE-Based VPN Discovery, Draft-IETF-L2VPN-Radius-PE-Discovery-00.TXT, Feb. 1, 2004, Publisher: IETF.ORG, Published in: Internet.

* cited by examiner

*Primary Examiner*—Wing F Chan
*Assistant Examiner*—Brian Roberts
(74) *Attorney, Agent, or Firm*—Patent Capital Group

(57) ABSTRACT

A method and apparatus for configuring a network interface to support a virtual private network includes storing configuration data at a server on a host computer on the provider network. It is determined whether conditions are satisfied for sending the configuration data to a particular node at an edge of the provider network. If it is determined that conditions are satisfied, then the configuration data is sent to the particular node to cause the particular node to configure a particular interface for supporting a virtual private network over the provider network based on the configuration data without human intervention. The provider network is a packet-switched network and the particular virtual private network is a link layer virtual private network. The particular node is different from the host. The particular interface is for a direct communication link to a customer network node outside the provider network.

72 Claims, 10 Drawing Sheets

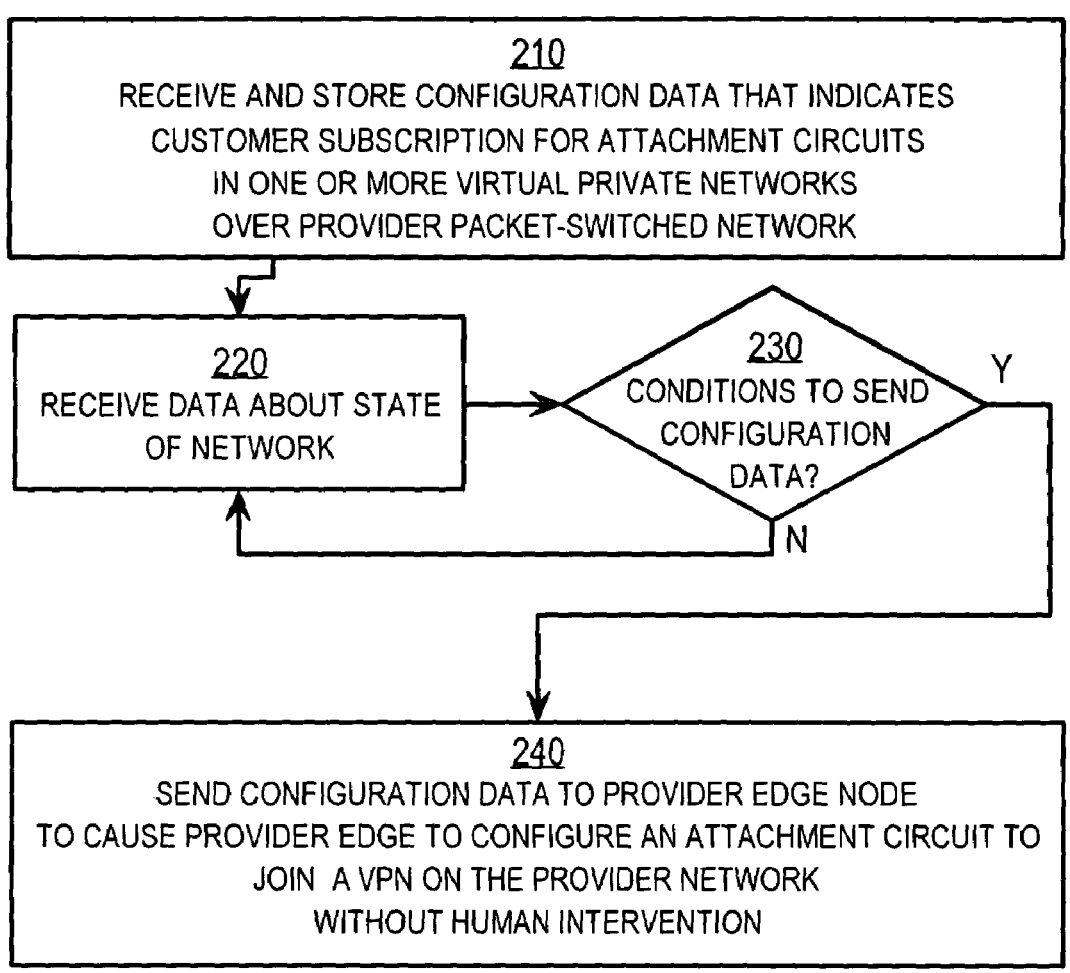

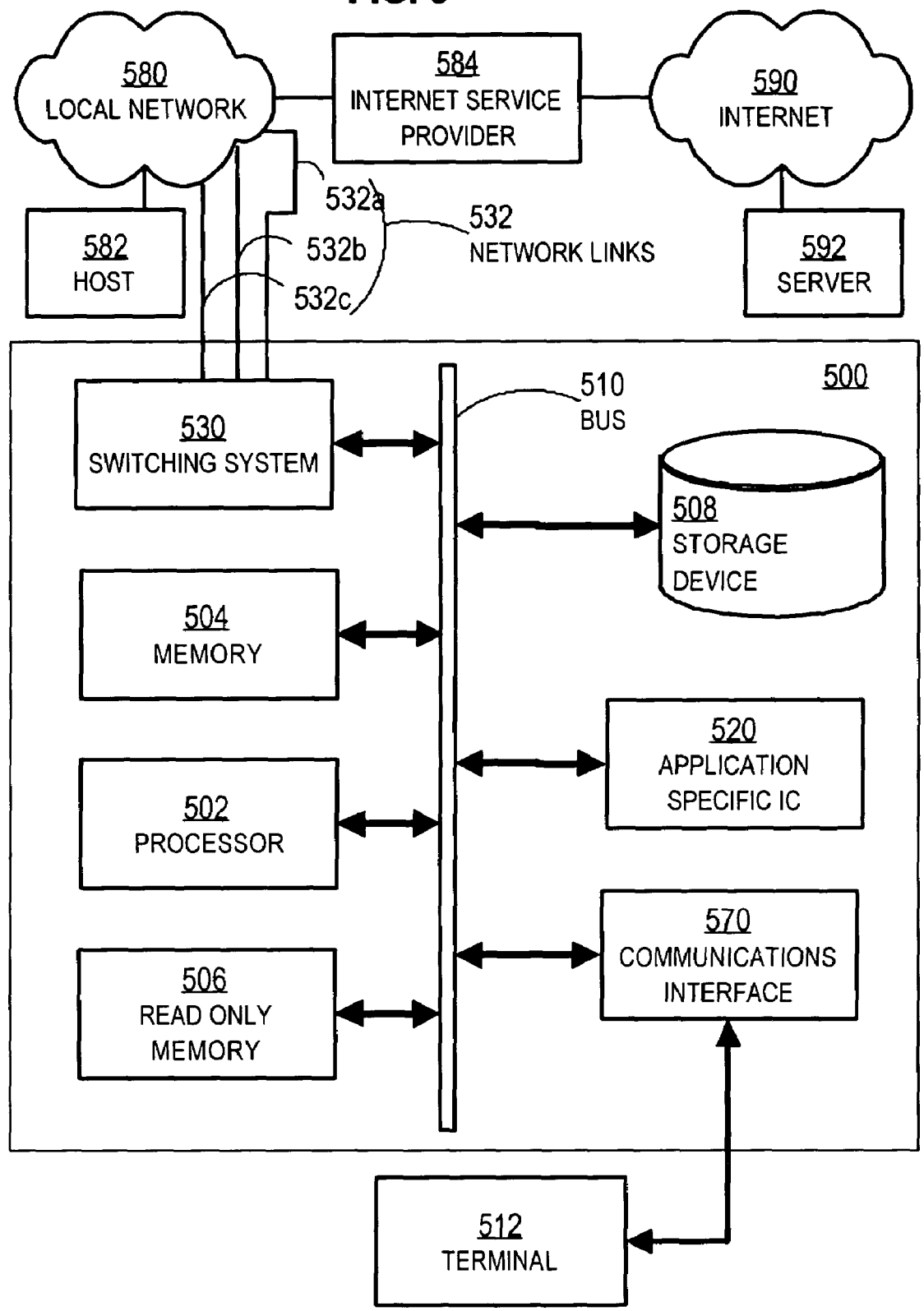

TECHNIQUES FOR ZERO TOUCH PROVISIONING OF EDGE NODES FOR A VIRTUAL PRIVATE NETWORK

CROSS-REFERENCE TO RELATED APPLICATIONS

This application claims benefit of Provisional Appln. Ser. No. 60/654,661, filed Feb. 19, 2005, the entire contents of which are hereby incorporated by reference as if fully set forth herein, under 35 U.S.C. §119(e).

BACKGROUND OF THE INVENTION

1. Field of the Invention

The present invention relates to establishing one or more virtual private networks (VPNs) using layer 2 protocols on a packet switching infrastructure that belongs to a trusted service provider; and in particular to configuring each customer interface to a provider edge network node for VPN operation without human intervention.

2. Description of the Related Art

Networks of general purpose computer systems connected by external communication links are well known and widely used in commerce. The networks often include one or more network devices that facilitate the passage of information between the computer systems. A network node is a network device or computer system connected by the communication links.

Information is exchanged between network nodes according to one or more of many well known, new or still developing protocols. In this context, a "protocol" consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The payload protocol is said to be encapsulated in the header protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

The layer 2 tunneling protocol (L2TP) is a link layer (layer 2) protocol established to provide a persistent virtual circuit as a tunnel between two end nodes of a trusted sub-network. In network parlance, a tunnel for data is simply a protocol that encapsulates that data. The persistent tunnel, or virtual circuit on a packet switched network is often called a pseudo-wire. L2TP facilitates the tunneling of point to point protocol (PPP) packets across an intervening network in a way that is as transparent as possible to both end-users and applications. Using L2TP tunneling, an Internet Service Provider (ISP), or other access service, can create a pseudo wire to link customer's remote sites or remote users with corporate home networks. More recent versions of L2TP facilitates tunneling of a number of data link types, including, but not limited to, Point to Point Protocol (PPP), Frame Relay (FR), Asynchronous Transfer Mode (ATM), High Level Data Link Control (HDLC) and Ethernet. L2TP is described at the time of this writing in Internet Engineering Task Force (IETF) request for comments (RFC) 2661 which can be found in a file named rfc2661.txt, which can be found, along with other RFC files, at the world wide web domain ietf in class org in the file directory named rfc. The entire contents of RFC 2661 are hereby incorporated by reference as if fully set forth herein. L2TPv3 is described in RFC 3817 available in file rfc3817.txt in the same directory.

Some protocols follow a layer 2 protocol and precede a layer 3 protocol; and are said to be layer 2.5 protocols. For example, the multi-protocol layer switch (MPLS) is a layer 2.5 protocol that provides for the designation, routing, forwarding and switching of traffic flows through a network and supports the transfer of multiple data link (layer 2) types. MPLS is described at the time of this writing in IETF RFC 3031 and RFC 3032 which can be found in files named rfc3031.txt and rfc3031.tx, the entire contents of which are hereby incorporated by reference as if fully set forth herein.

A virtual private network (VPN) is a technology to logically separate the data packets traveling over the same physical network, so that a user of one VPN does not see the data communicated between users of a different VPN. ISPs frequently offer to customers VPNs that are implemented as one or more pseudo wires on a packet switched network (PSN) infrastructure, such as a network of routers using the Internet Protocol (IP) as a layer 3 protocol or using MPLS as a layer 2.5 protocol. A common approach for providing the tunneling functions for a VPN is to use the layer 2 tunneling of L2TPv3 as a payload in IP data packets. In some approaches a protocol for Any Transport over MPLS (AToM) available from CISCO SYSTEMS™, Inc. of San Jose Calif. is used to support layer 2 tunneling in a payload in MPLS data packets. Then layer 2 protocols, such as PPP, FR, ATM, HDLC, Ethernet are used in persistent tunnels to transmit customer data over a VPN.

A customer contracts with an ISP to provide a VPN among customer sites and to support certain kinds and amounts of data traffic over that VPN. In response, the ISP configures interfaces to customer equipment on several intermediate network nodes at the edge of an ISP network (so-called "provider edge nodes," PE, or simply "edge nodes"). Each interface is configured to communicate the type of traffic designated for that interface and encapsulate it in one or more tunnels, each tunnel directed to one of one or more other interfaces on other edge nodes of the ISP network. In the parlance of this technology, configuring each affected interface on each affected edge node provisions the VPN.

A PE interface to customer equipment (CE) is called an attachment circuit (AC) or port. Each physical interface can support one or more logical attachment circuits. For example, a single physical interface for ATM traffic can support multiple ATM virtual circuits, which may be directed to different VPNs; each ATM virtual circuit is considered a different AC to be configured. Configuration data specifies values for one or more parameters for each attachment circuit (AC). The parameters and values depend on the layer 2 protocol to be supported in the VPN, the topology of the VPN, and the tunneling protocol used to establish the pseudo wires. Example configuration data for a logical ATM AC specifies a percentage of total bandwidth devoted to the logical AC, a cell-packing value, the other PE devices in the topology, and a control plane protocol to establish and maintain pseudo wires among the connected PE.

Currently, provisioning the VPN is a manual process, in which a network administrator determines which data packets on each interface are sent out on which link to the provider network using which designations to be recognized by a subsequent intermediate nodes and edge node as a separate tunnel. The manual provisioning process is tedious and error prone. Furthermore, when a new piece of customer equipment is connected to an edge node, that equipment is unable to communicate over the VPN unless and until the human administrator provisions the VPN to add the new interface. Thus the process is subject to delays. The delays grow in severity as the human administrator becomes busier. The tedium and propensity for error increase with the complexity of the VPN topology (e.g., as the numbers of interfaces and edge nodes increase).

Based on the foregoing description, there is a clear need for techniques to provision a VPN on a provider's network without the deficiencies of prior art approaches. In particular, there is a clear need for techniques to provision a VPN on a provider's network without human intervention whenever a new attachment circuit or provider edge node is added to or removed from the VPN.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram that illustrates at a high level a method for provisioning a virtual private network at a server distinct from a provider edge node, according to an embodiment;

FIG. 5 is a block diagram that illustrates a computer system upon which an embodiment of the invention may be implemented.

DETAILED DESCRIPTION

A method and apparatus are described for zero touch provisioning of edge nodes for virtual private networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Certain embodiments of the invention are described in the context of a single server on a host of a provider network away from the provider edge, which provisions a single, layer-two virtual private network (VPN) on an Internet Protocol (IP) infrastructure for a single customer; but the invention is not limited to this context. In other embodiments, one or more servers on hosts at or away from the provider edge provision one or more layer-two VPNs for one or more customers using one or more protocols on a packet switching network based on one or more protocols above layer 2, such as IP and multi-protocol layer switch (MPLS) protocol.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

1.0 Example Virtual Private Network

Figure 1A:
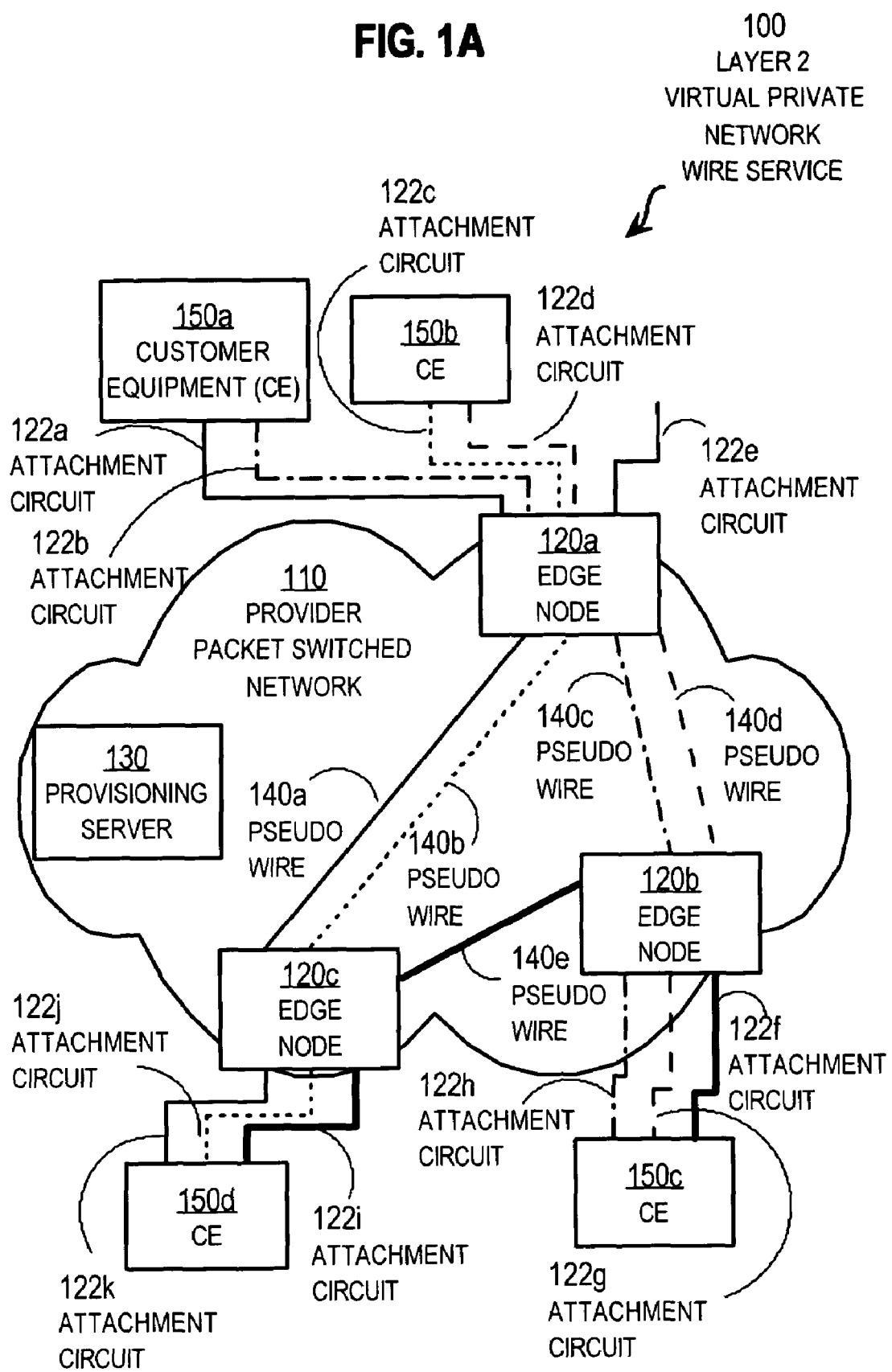
FIG. 1A is a block diagram that illustrates a virtual private network on a provider packet-switched network for a virtual private wire service, according to an embodiment.

FIG. 1A is a block diagram that illustrates a virtual private network 100 based on a virtual private wire service (VPWS) on a provider packet-switched network (PSN) 110, according to an embodiment. The provider PSN 110 includes two or more edge nodes, e.g., PE 120a, 120b, 120c (collectively referenced hereinafter as PE 120). Each PE 120 includes one or more physical interfaces to which customer premises equipment (CE) may be connected. The physical interfaces support one or more physical or logical attachment circuits (ACs) used by the customer to communicate over network 110. For example, PE 120a includes ACs 122a, 122b, 122c, 122d, 122e. CE 150a is connected to PE 120a through ACs 122a, 122b; and CE 150b is connected to PE 120a through ACs 122c, 122d. AC 122e is available for connecting to CE, but no CE is currently connected. Similarly, CE 150c is connected to PE 120b through ACs 122f, 122g, 122h. CE 150d is connected to PE 120c through ACs 122i, 122j, 122kh. The CEs 150a, 150b, 150c, 150d are collectively referenced hereinafter as CEs 150. The ACs 122a, 122b, 122c, 122d, 122e, 122f, 122g, 122h, 122i, 122j, 122k are collectively referenced hereinafter as ACs 122. Also shown is server 130 on PSN 110.

VPN 100 includes multiple tunnels between pairs of PEs. Each such tunnel is called a virtual circuit or pseudo wire (PW). FIG. 1A depicts five PWs, 140a, 140b, 140c, 140d, 140e (collectively referenced hereinafter as PWs 140) used to provide VPWS for point to point traffic among CEs 150. Point-to-point data packet traffic between CE 150a and CE 150d is carried by AC 122a and PW 140a and AC 122k. Point-to-point data packet traffic between CE 150b and CE 150d is carried by AC 122c and PW 140b and AC 122j. Similarly, point-to-point data packet traffic between CE 150a and CE 150c is carried by AC 122b and PW 140c and AC 122h; and such data packet traffic between CE 150b and CE 150c is carried by AC 122d and PW 140d and AC 122g. Point-to-point data packet traffic between CE 150c and CE 150d is carried by AC 122f and PW 140e and AC 122i. In some embodiments, one or more ACs 122 are logical ACs that share the same physical wire; e.g., ACs 122a, 122b are logical ACs that share the same physical transmission medium from edge node 120a to CE 150a. For example, FR, ATM and Ethernet virtual local area networks (VLANs) are attachment circuits which allow multiple customers (or services) to be transported on the same physical wire.

This complete collection of PWs in FIG. 1A is called a full mesh. In some circumstances, such a full mesh involves more PWs and associated costs than are needed. For example, if customer needs are satisfied so long as CE 150d has a PW to CE 150b and CE 150c has a PW to CE 150a, then only two PWs are needed, e.g., 140a and 140c, with fewer associated attachment circuits including only 122j, 122c and 122h, 122b.

Figure 1B:
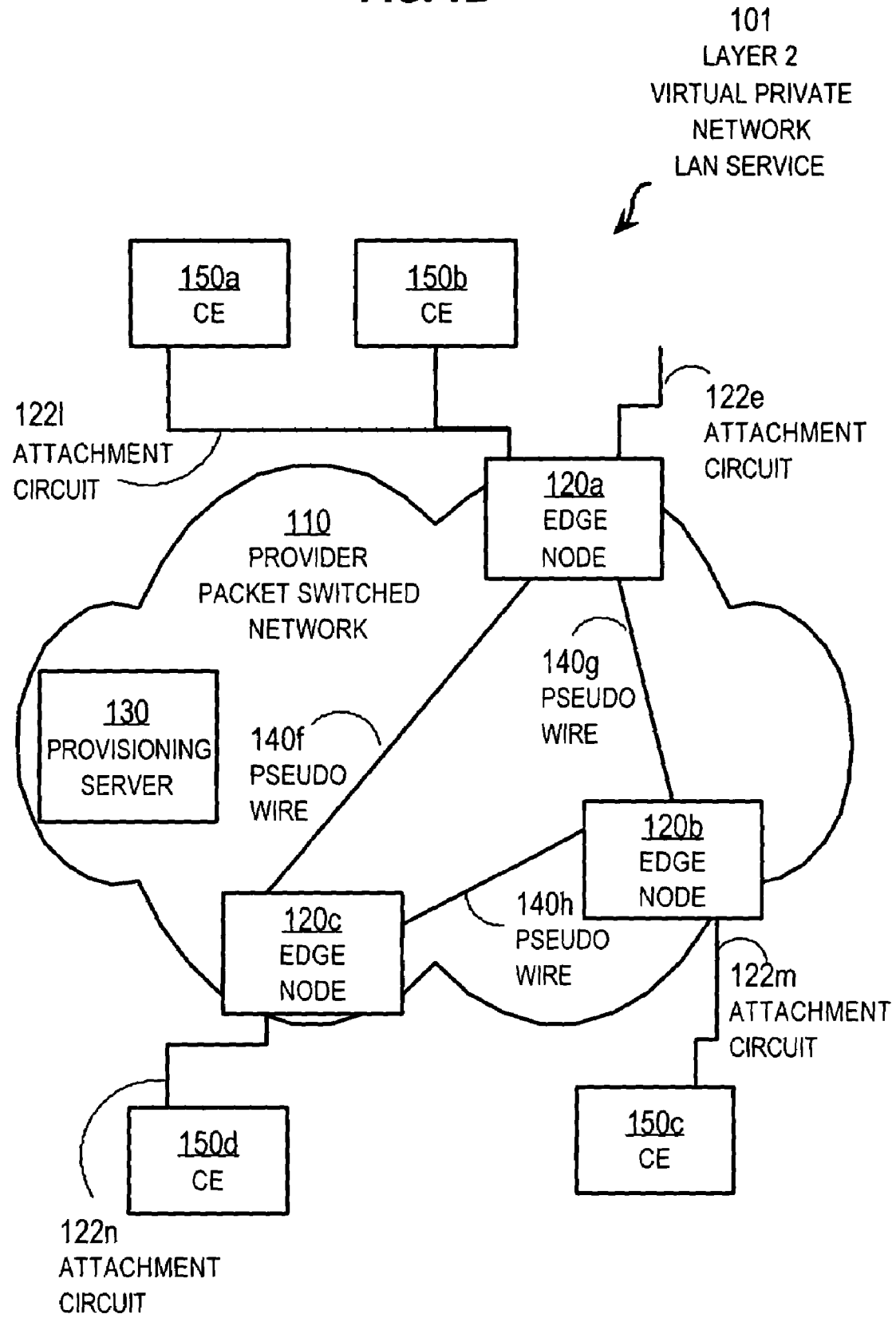
FIG. 1B is a block diagram that illustrates a virtual private network on a provider packet-switched network for a virtual private LAN service, according to an embodiment.

In some VPN service, called a virtual private local-area network (LAN) service (VPLS), every CE is connected to every other CE on the VPN and data traffic flows to then all as if on an Ethernet LAN. FIG. 1B is a block diagram that illustrates a virtual private network 101 on a provider packet-switched network 110 for VPLS, according to an embodiment. For example, VPN 101 includes sufficient PWs 140f, 140g, 140h to connect each PE 120a, 120b, 120c to the others. Traffic between different CEs on the VLAN is not distinguished by separate ACs and separate PWs. Thus, CEs 150a, 150b are on the same LAN, which forms AC 122l, and traffic from both is carried to CE 150c via a single PW 140g to PE 120b and thence via a single AC 122m. Similarly traffic from both is carried to CE 150d via a single PW 140f to PE 120c and thence via a single AC 122n. Inactive AC 122e is kept separate for use in a different VPLS or VPWS VPN. Clearly, the provisioning of PSN 110 is different for the different VPNs 100 and 101, even though both involve the same PEs and CEs.

2.0 Method at Server for Provisioning a VPN

According to various embodiments of the invention, one or more servers on the provider network store and send configuration data to provision without further human intervention one or more VPNs. For example, provisioning server 130 stores and sends configuration data to PE 120a to switch traffic for AC 122a with PW 140a, AC 122b with PW 140c, AC 122c with PW 140b and AC 122d with PW 140d. Similarly, provisioning server 130 stores and sends configuration data to PE 120b and PE 120c. Even with the relatively simple topology of FIG. 1A, the danger of errors during manual configuration is high.

According to some embodiments, server 130 also stores configuration data for unused AC 122e. When a new CE (not shown) or service is connected to AC 122e, server 130 sends the configuration data to PE 120a and causes new PWs (not shown) to be formed with PE 120b or PE 120c or both. Similarly server 130 sends configuration data to PEs 120b, 120c that cause those PEs to switch the new PWs with new ACs (not shown) on PEs 120b, 120c. Thus server 130 provisions VPN 100 without human intervention. If AC 122e joins VPN 101, instead of joining VPN 100, then server 130 causes PE 120a to merge AC 122e with LAN AC 122l and sends traffic from AC 122e over both extant PWs 140a, 140c.

Figure 2B:
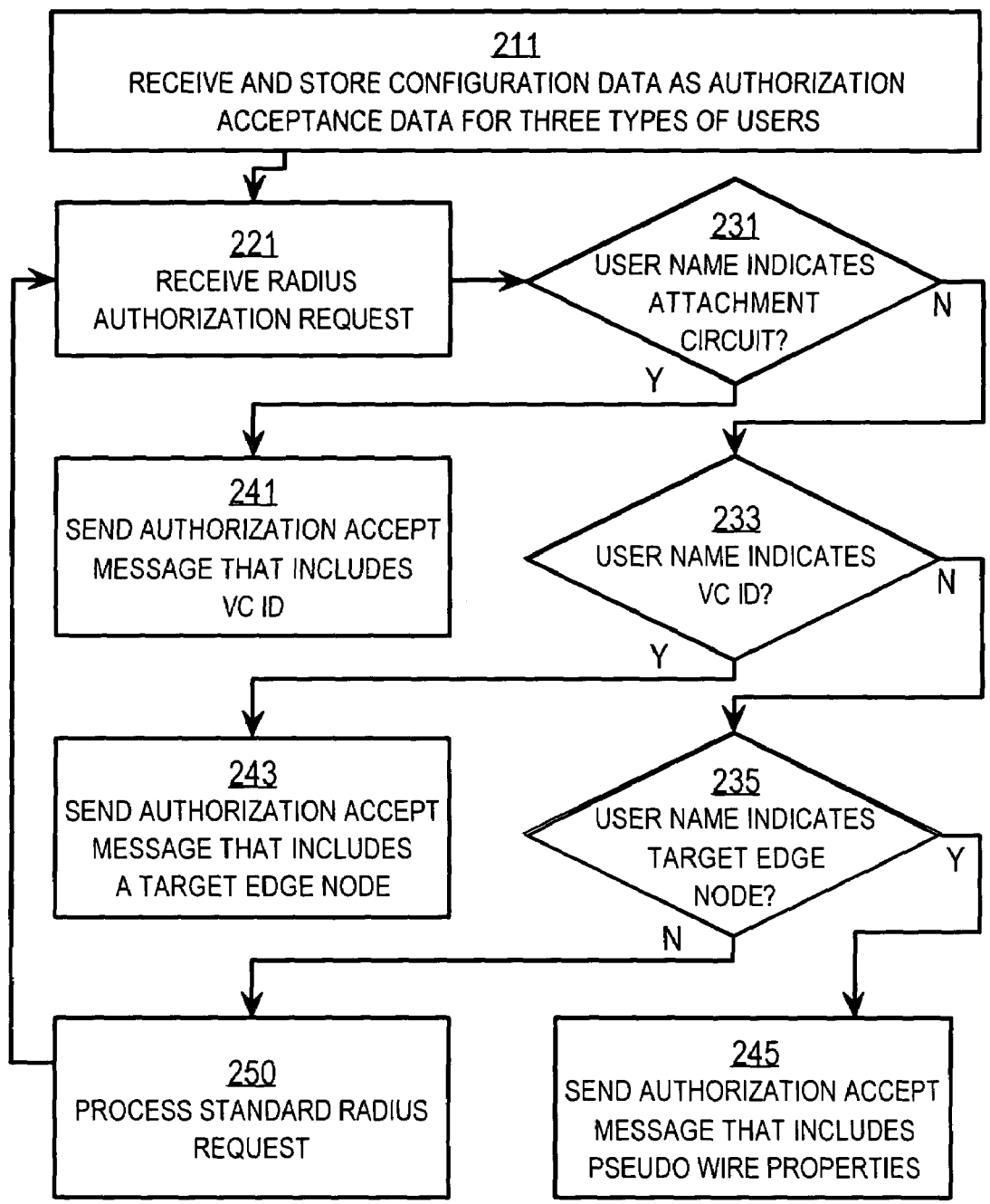
FIG. 2B is a flow diagram that illustrates at a high level a method for provisioning a virtual private network at a RADIUS server, according to an embodiment.

FIG. 2A is a flow diagram that illustrates at a high level a method 200 for provisioning a virtual private network at a server distinct from a provider edge node, according to an embodiment. Although steps are shown in FIG. 2A and subsequent flow diagrams (e.g., FIG. 2B, FIG. 4A, FIG. 4B, FIG. 4C) in a particular order for purposes of illustration, in other embodiments one or more steps may be performed in a different order or overlapping in time or omitted, or changed in some combination of ways.

During step 210, configuration data is received at the server and stored. The configuration data indicates values for one or more parameters relevant to configuring one or more attachment circuits to participate in one or more virtual private networks over the provider packet switched network. Any method may be used to receive this configuration data. In some embodiments, the configuration data is input manually by a network administrator and stored locally or on a remote node. In some embodiments, the data is retrieved from storage locally or remotely. In some embodiments, the data is sent in a message from another node on the network either in response to a message from the peer requesting the data or in an unsolicited message. In some embodiments a combination of different methods is used.

Often, the configuration data is derived based on customer specifications for the topology for the VPN and level of surface obtained when the customer subscribes to the service. For example, configuration data is received and stored at server 130 that indicates for VPN 100 the service is VPWS, the attachment circuits 122 are frame relay virtual circuits, each called a data link connection identifier (DLCI), the participating edge nodes are PEs 120a, 120b, 120c, and PWs 140a, 140b, 140c, 140d, 140e have a certain level of service, e.g., a certain value for a per-hop behavior (PHB) parameter. The use of PHB to indicate level of service is described in RFC 3140 entitled "Per Hop Behavior Identification Codes," by D. Black, S. Brim, B. Carpenter, F. Le Faucheur (June 2001), the entire contents of which are hereby incorporated by reference as if fully set forth herein.

In an alternative example, configuration data is received and stored at server 130 that indicates for VPN 100 the service is VPWS, the attachment circuits 122*b*, 122*c*, 122*h*, 122*j* are ATM virtual circuits, the participating edge nodes 120 are PEs 120*a*, 120*b*, 120*c*, with connecting pseudo wires PW 140*b* and PW 140*c* that are built on MPLS and have a level of service indicated by a value of an MPLS experimental (EXP) parameter. The use of EXP to indicate level of service is described in RFC 3032 entitled "MPLS Label Stack Encoding" by E. Rosen, D. Tappan, G. Fedorkow, Y. Rekhter, D. Farinacci, T. Li, A. Conta, (January 2001), the entire contents of which are hereby incorporated by reference as if fully set forth herein. RFC 3032 and RFC 3140 are implementations of Differentiated Services Code Point (DSCP) described in RFC 2474 entitled "Definition of the Differentiated Services Field (DS Field) in the IPv4 and IPv6 Headers," by K. Nichols, S. Blake, F. Baker, D. Black (December 1998), the entire contents of which are hereby incorporated by reference as if fully set forth herein.

During step 220, data about the state of the network is received. The network state data may be received in any manner, such as described above for the configuration data. For example, in some embodiments, the configuration data indicates that a particular interface is to join a VPN at a particular time, and the state data simply indicates the current time. In some embodiments, the data about the state of the network is received as a message from a provider edge node, e.g., PE 120, that a particular physical or logical interface on that PE 120 has become active. In some embodiments, the server polls one or more nodes on the provider packet-switched network 110 during step 220 to determine the current state of the network. In some embodiments, the state data is received from a human administrator who indicates when one or more interfaces on a PE should be configured.

In step 230, it is determined whether conditions in the network are satisfied to send configuration data to one or more of the provider edge nodes, e.g., PEs 120, based on the data received in step 220. Any conditions may be used to determine when to send the configuration data to the edge nodes. In some embodiments, the current state data is compared against stored state data, and the condition is satisfied when the current state matches the stored state. In some embodiments, the condition is satisfied when a certain message is received from a human administrator, or from a different server, or from a PE 120. For example, in some embodiments, a customer subscribes to a VPN service on the provider's public web site, and the conditions are satisfied when the web site server sends a message to the configuration server 130 to activate the service.

In step 240, the configuration server sends configuration data to the provider edge node so that the provider edge node can configure the customer interface to send data over the VPN without human intervention. Thus a human administrator does not touch the provider edge node at the time it is configured to connect an attachment circuit to a VPN. This is called zero touch provisioning.

For example, when the server 130 is requested to send configuration data to PE 120*c*, server 130 sends configuration data to PE 120*c*. The configuration data indicates VPWS for VPN 100 with an ATM virtual circuit as attachment circuit 122*j*, switching cells on that virtual circuit with a PW to PE 120*a*, and forming the PW 140*b* with certain properties.

In a VPLS, the PW (e.g., 140*f*) is likely already established. If the PW is not already established, the PW is set up by having the configuration-receiving PE (e.g., PE 120*c*) send an advertisement to the remote PE (e.g., PE 120*a*), indicating at least an identifier for the set of PEs that make up the VPN. The remote PE (e.g., PE 120*a*) can request further details about that set of PWs from the provisioning server (e.g., server 130), to complete configuration at the remote PE. Using single-sided signaling, the advertisement includes all the data used by the remote PE, so that the remote PE does not query the provisioning server.

In a VPWS, the PW is likely not yet established. The configured PE (e.g., PE 120*c*) then sends an advertisement to the remote PE containing at least a PW identifier. In some embodiments, described in more detail below, the advertisement includes an identifier for the AC on the configured PE (e.g., PE 120*c*) sending the advertisement. The remote PE (e.g., PE 120*a*), then either acknowledges the advertisement or stores the advertisement for later acknowledgement. The remote Pe (e.g., PE 120*a*) acknowledges the PW (e.g., PW 140*a*) when the remote PE detects an AC on the remote PE that is associated with the same PE (e.g., AC 122*a* associated with PW 140*a*), as indicated by data received at the remote PE (e.g., PE 120*a*) from the provisioning server (e.g., server 130). Using single-sided signaling, the configuration data received by the configured node (e.g., 120*c*) from the server (e.g., server 130) includes all the data used by the remote PE (such as the AC 122*a* to be associated with the PW 140*a*). All this data is then included in the advertisement so that the remote PE (e.g., 120*a*) obtains the association without querying the provisioning server (e.g., server 130).

There are several advantages of the method 200 compared to the prior art practice. One obvious advantage is that a human administrator is not required at the time the conditions are satisfied for doing the configuring. The provisioning information is prepared ahead of time when it is stored on the server and when there is less time pressure and less chance of error. There is also less delay, because the configuration information is available automatically as soon as conditions are satisfied, without having to wait for a human in the process. Also, when a provider edge node is replaced, its configuration data is still available on the server.

By the same token, repeated configuration of the same attachment circuits are accommodated without any additional effort. For example, if the physical interface carrying logical attachment circuits 122*i*, 122*j*, 122*k* needs to be replaced, the information to configure it is already available on the server. The new physical interface is placed in PE 120*c*, and the server 130 is prompted for the configuration data appropriate for it. Without further human intervention, the desired configuration information is sent from the server 130 to PE 120*c* and used by PE 120*c* to configure the three logical attachment circuits and their associations with PWs 140*a*, 140*b*, 140*e*. Under prior art practice, the human administrator would have to be involved to manually configure the new interface, either locally or at a remote management tool server and force the new configuration data down to the affected edge nodes.

Another advantage is that only the configuration data for active interfaces are stored and used by the PE 120. For example, if CE 150*b* and CE 150*c* are not yet connected to PE 120*a* and 120*b*, respectively, then the configuration data sent to PE 120*c* is only for attachment circuit 122*k* to PW 140*a* to PE 120*a*. The configuration data for the other attachment circuits 122*i*, 122*j* are not sent nor processed at the PE 120*c*. This saves both memory and computational resources at PE 120*c* and the network bandwidth that would be consumed to sent the additional configuration data.

In some embodiments, only the changed configuration data is sent. For example, when CE 150*c* joins VPN 100, only the configuration data for AC 122*i* and PW 140*e* to PE 120*b* is sent to PE 120*c*. This is an advantage over a prior approach in which a large block of commands for configuring every customer interface is sent whenever there is any change. The prior art approach would send configuration data for not only the new AC 122*i*, but also for the AC 122*j* that PE 120*c* already has. The prior art approach thus consumes extra network bandwidth in transmitting the configuration data already in the possession of the receiving node. Furthermore, the prior approach also consumes extra processor resources on the receiving edge node as it causes the receiving edge node to either reconfigure the attachment circuit that is already operating or parses the commands to avoid reconfiguring that attachment circuit. Furthermore, as the extra processing is done, resources are diverted from processing traffic on the attachment circuit.

One prior approach uses a RADIUS server to store data indicating all the provider edge nodes on a given VPN. While the list of other provider edge nodes on a VPN is part of configuration data, providing only this information does not, by itself, alleviate the involvement of a human administrator. In the prior approach, the human administrator still touches each provider edge node to configure it as a member of the VPN and associate the VPN with one or more attachment circuits and to indicate the type of pseudo wire properties to use. Each provider edge node then sends a message to the RADIUS server to indicate that provider edge node's membership in the VPN and to request the names of the other provider edge nodes currently members of the VPN. In some embodiments of this approach, the RADIUS server polls each provider edge node to determine the VPN memberships as set on the provider edge by the human administrator.

In other prior art approaches, a manufacturer-specific command language (e.g., the command line instructions, CLI, of Cisco Systems Inc., San Jose, Calif.) is used to configure attachment circuits for a VPN based on input by a human administrator. In some embodiments of the present invention, an open protocol is used to communicate between server 130 and provider edge nodes, e.g., PEs 120. An advantage of using an open protocol is that open protocol servers are widely deployed and supported. For example, in some embodiments the simple network management protocol (SNMP) is used to exchange messages between provider edge nodes and server 130. In some embodiments, server 130 is a Network Management Server (NMS) that is used or modified to handle the configuration data with SNMP. Other open protocols and corresponding or modified servers may be used to send some or all configuration data between configuration server (e.g., server 130) and provide edge nodes (e.g., PE 120), including but not limited to the Border Gateway Protocol (BGP), the Label Distribution Protocol (LDP), the generic attribute registration protocol (GARP) virtual local area network (VLAN) Registration Protocol (GVRP), and the Resource Reservation Protocol (RSVP).

In some embodiments described in more detail in the next section, the Remote Authentication Dial-In User Service (RADIUS) protocol is used to exchange configuration data and a RADIUS server is used or modified to perform some or all of the functions of server 130.

3.0 Radius Server for Provisioning a VPN

In this next section, the use of the RADIUS protocol and RADIUS server as provisioning server 130 is described. RADIUS is well-known and widely used in the art and is described in RFC2865, the entire contents of which are hereby incorporated by reference as if fully set forth herein. In RADIUS terms, the customer premises equipment CE 150 are users and the provider edge nodes PE 120 are network access servers (NAS) implementing RADIUS client functionality. In the case in which a CE belongs to a foreign VPN of another provider, the RADIUS server of the local provider acts as a proxy client to a RADIUS server of the foreign provider.

There are several advantages to using a RADIUS server. RADIUS servers are already widely deployed on a large number of provider packet-switched networks. The RADIUS protocol allows for the definition of new attributes that can be defined to hold configuration data, as described in the following. RADIUS is designed to give prescribed responses to prescribed requests, as is needed to return prescribed configuration data for requests. The RADIUS protocol also allows for the definition of vendor-specific attributes that can be defined to hold configuration data. RADIUS has recently been extended to support an on-demand push model, so that network state can be determined by any server, which can then prompt the RADIUS server to push configuration data to a PE. Furthermore, the RADIUS protocol does not preclude adding additional functionality to a RADIUS server, as long as the necessary functions are performed.

In an illustrated embodiment of the invention, a RADIUS server is used as a provisioning server 130 for configuration data to provision one or more VPNs. In this embodiment, an AC identifier (AC ID) is associated with a virtual circuit identifier (VC ID) that indicates a collection of one or more pseudowires in a VPN. The VC ID is associated, in turn, with one or more other PEs 120, and associated with one or more PWs 140. Thus hierarchical relationships among VPNs, PEs, PWs, and ACs are stored in the flat files of RADIUS records. In an example embodiment, configuration data is stored by a RADIUS server when a customer first contracts for service.

When particular conditions are satisfied, configuration data is sent to the edge node automatically, without human intervention. For example, when the edge node detects a first sign of life on an interface having a particular AC ID, the edge node sends a RADIUS request message to the RADIUS server with the AC ID. In response, the edge node receives associated VC ID or PW properties or both. As another example, on a particular date when contracted services are scheduled to begin, the RADIUS server sends the configuration data to the affected edge nodes.

Based on the AC ID in the configuration data sent by RADIUS server, the receiving edge node determines how to switch and encapsulate traffic on the associated AC into one or more tunnels (PWs) associated with a particular VPN. Thus substantial delays are avoided between a time that a customer contracts for services (or customer premises equipment is connected to an edge node) and a time when the associated VPN can be used.

3.1 Data Structures at a Radius Server for Provisioning a VPN

Figure 3A:
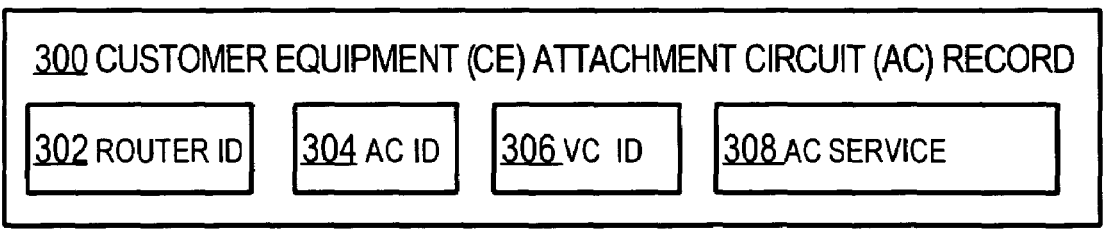
FIG. 3A is a block diagram that illustrates a customer interface record on a provisioning server, according to an embodiment.

Example data structures for storing configuration data on a RADIUS server are illustrated in FIGS. 3A, 3B, 3C, and 3D. Some or all of these data structures may be used in other embodiments of server 130 that do not use the RADIUS protocol. FIG. 3A is a block diagram that illustrates a customer interface record 300 on a provisioning server, according to an embodiment. In the illustrated embodiment, the record 300 includes four fields, a router identification (Router ID) field 302, an attachment circuit identification (AC ID) field 304, a VC identification (VC ID) field 306, and an attachment circuit (AC) service field 308.

The Router ID field 302 holds data that uniquely indicates a provider edge node that is to receive the configuration data.

In the illustrated embodiment, this provider edge node sends a RADIUS authorization request to the RADIUS server. The value of the Router ID field 302 serves as an index to a particular record in the data stored on the RADIUS server. Any method may be used to indicate the attachment circuit. In an illustrated embodiment, the value of the. Router ID field is the IP address of the provider edge node on the provider network. An IP address is four octets that are commonly designated by four decimal values separate by three dots, where each decimal value falls between 0 and 255, inclusive. An advantage of this embodiment is that the IP address of the requesting edge node is included in the header of an IP data packet carrying the RADIUS authorization request and is automatically used by the RADIUS server to find the appropriate record to use in a response. For purposes of illustration, it is assumed that PEs 120a, 120b, 120c have IP addresses 1.1.1.1, 1.1.1.2 and 1.1.1.3, respectively.

According to a particular embodiment, a PE-Router-ID attribute is added to the RADIUS attributes of RFC2865. The PE-Router-ID attribute includes a first octet (eight bits) that indicates the type is a PE-Router-ID, a second octet that indicate the length of the attribute is six octets, and four octets that hold the value, e.g., the IP address or an arbitrary number assigned by the owner of the ID space. In this embodiment, the Router ID field 302 holds the PE-Router-ID attribute. For example, the value of PE-Router-ID for PE 120a is given by the six octets X.6.1.1.1.1, where the octet value "X" indicates the type is a PE-Router-ID and is assigned by agreement of the RADIUS protocol authority or as a vendor-specific attribute.

According to a particular embodiment, a PE-Address attribute is also added to the RADIUS attributes of RFC2865. The PE-Address attribute includes a first octet that indicates the type is a PE-Address, a second octet that indicate the length of the attribute is six octets, and four octets that hold the IP address. In some embodiments, the Router ID field 302 holds the PE-Address attribute. For example, the value of PE-Router-ID for PE 120a is given by the six octets Y.6.1.1.1.1, where the octet value "Y" indicates the type is a PE-Address and is assigned by agreement of the RADIUS protocol authority or as a vendor-specific attribute.

In some embodiments, the Router ID field 302 holds either the RADIUS PE-Address attribute or the RADIUS PE-Router-ID, as can be determined by the type in the first octet.

The AC ID field 304 holds data that indicates a physical or logical attachment circuit on a provider edge node that is a member of a VPN. The value of the AC ID field 304 serves as a secondary index to a particular record in the data stored on the RADIUS server. Any method may be used to indicate the attachment circuit. In one embodiment, the AC ID field 304 holds data that uniquely indicates a physical links on the router identified in Router ID field 302. For example, a certain class of routers internally number the physical interfaces on each router form 0 through N-1, where N is the number of physical interfaces. In some embodiments the physical interfaces are named in software. In some embodiments, the AC is uniquely indicated by an arbitrary value (e.g., a name or number).

In some embodiments, the AC ID is based on a logical attachment circuit, such-as a frame relay or ATM virtual circuit name, used on the CE. For example, ATM virtual circuits are identified by an ATM port name, a one-octet virtual path identifier (VPI) that indicates a group of virtual circuits, and a two-octet virtual channel identifier (VCI) in the header of a ATM cell. The VPI/VCI combination is used to identify the next destination of an ATM cell as it passes through a series of ATM switches. In embodiments using the ATM virtual circuit identifier as an arbitrary name for an attachment circuit, the AC ID comprises the ATM port, VPI and VCI. For example, if the ATM port is named "atm1/0" and the VPI is "2" and the VCI is "34," then an appropriate AC ID is "atm1/0.2.34." Since the customer subscribes to the VPN, the customer names for the virtual circuits are appropriate to use as an index into the configuration data stored on the RADIUS server.

In some embodiments, the AC ID field 304 holds CE ID data that uniquely identifies a piece of customer premises equipment connected to provider edge equipment. For example, a network access identifier (NAI) or a Domain Name Server (DNS) host name associated with the CE can serve as CE ID data. The use of NAI to indicate a CE is described in RFC 2486 entitled "The Network Access Identifier," by B. Aboba, M. Beadles (January 1999), the entire contents of which are hereby incorporated by reference as if fully set forth herein. The use of DNS to indicate a CE is described in RFC 1101 entitled "DNS encoding of network names and other types," by P. V. Mockapetris (April 1989), the entire contents of which are hereby incorporated by reference as if fully set forth herein. It is assumed for purposes of illustration that CP 150d has an NAI of "providerX/atlanta@vpnY.domainZ.net." For VPLS or for a CE with a single attachment circuit to a provider edge node, an AC ID value that is only a CE ID value is sufficient to determine VPN membership. For VPWS and a CE with multiple logical or physical attachment circuits to a provider edge, an AC ID includes both a CE ID along with a customer name for an attachment circuit to determine a unique identifier for an attachment circuit, and thence VPN membership.

In some embodiments, the AC ID field 304 holds either an AC specific identifier or a CE identifier.

The VC ID field 306 holds data that uniquely indicates a particular collections of pseudo wires on the provider network, e.g., network 110. In a VPLS, the VC ID indicates all the pseudo wires in the VPN, e.g., PWs 140a, 140c, 140e in VPN 101. In a VPWS, the VC ID indicates a single pseudo wire that provides point-to-point traffic as part a particular VPN. In some embodiments the VC ID field 306 holds data that indicates a VPN-ID as described in RFC2685, the entire contents of which are hereby incorporated by references as if fully set forth herein.

According to a particular embodiment, a VPN-ID attribute is added to the RADIUS attributes of RFC2865. The VPN-ID attribute includes a first octet that indicates the type is a VPN-ID, a second octet that indicate the length of the attribute, and the length minus two (length−2) octets that hold text that indicates the value. The text is composed of two colon separated parts: a VPN authority organizationally unique identifier, and a VPN index number within the organization.

In some embodiments the VC ID field 306 holds data that indicates a VPN differently from the VPN-ID as described in RFC2685. According to a particular embodiment, a Router-Distinguisher attribute is added to the RADIUS attributes of RFC2865 as an alternative VC ID to the VPN-ID. The Router-Distinguisher attribute includes a first octet that indicates the type is a Router-Distinguisher, a second octet that indicate the length of the attribute, and length-2 octets that hold text that indicates the value. The text is composed of three colon-separated parts: a distinguisher type, an administrator identifier, and an assigned number. If the distinguisher type is "0", the administrator identifier contains a two-octet Autonomous System Number (ASN) defined by an Internetwork Autonomous Number authority, and the assigned number is a four-octet value assigned by the enterprise responsible for the ASN. As an example of this type, the text "0:114:23" indicates the administrator ANS is 114, and that administrator assigns a number 23 to the VC of interest. If the distinguisher type is "2", the administrator identifier contains a four-octet ASN, and the assigned number is a two-octet value assigned by the enterprise responsible for the ASN. As an example of this type, the text "2:70000:216" indicates the administrator ANS is 70000, and that administrator assigns a number 216 to the VC of interest. This is similar to distinguisher type 0, but with octets moved from the assigned number to the administrator identifier. If the distinguisher type is "1", the administrator identifier contains a four-octet IP address, and the assigned number is a two-octet value assigned by the enterprise controlling the IP address space. As an example of this type, the text "1:1.2.3.4:10001" indicates the administrator for the VPN name is at node 1.2.3.4, and that administrator assigns a number 10001 to the VC of interest.

In some embodiments, the VC ID field 306 holds either the RADIUS VPN-ID attribute or the RADIUS Router-Distinguisher attribute, as can be determined by the type in the first octet. In some embodiments, the VC ID serves as an attachment group identifier (AGI) so that each attachment circuit on a VPN can be uniquely identified within the group identifier using an attachment individual identifier (AII).

The AC Service field 308 holds data that describes the service to be provided to an AC or CE. In some embodiments, the field 308 includes data that indicates the type of service, e.g., whether the service type is VPLS, VPWS, or IP-only LAN-like Service (IPLS) or some other type of service. In some embodiments, the field 308 includes data that indicates attachment circuit specific parameters. Attachment circuit-specific parameter include, but are not limited to: a quality of service level associated with minimum values for bandwidth, and maximum values for latency and jitter; specific values for bandwidth, latency and jitter; an attachment circuit data plane protocol and control plane protocol; authentication credentials; attachment circuit original equipment manufacturer (OEM) signaling; and values for configurable parameters associated with those protocols, such as cell packing for ATM, maximum transmission unit (MTU) for packet sizes. For purposes of illustration, it is assumed that AC Service field 308 holds data that indicates a service type of VPWS with ATM protocol for both data and control planes on the attachment circuits, each attachment circuit allowed up to 40% of bandwidth on a physical interface, and a cell packing value of 1.

Figure 3B:
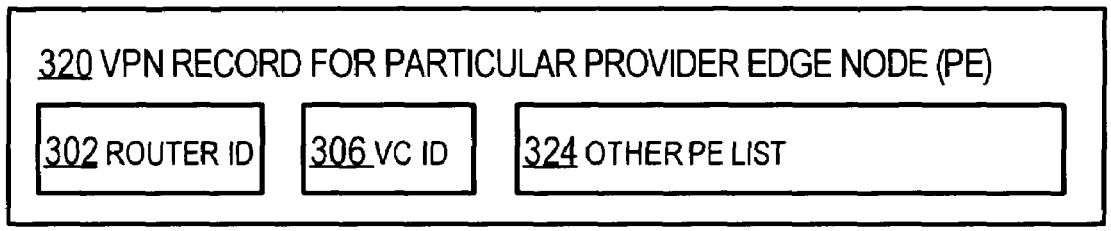
FIG. 3B is a block diagram that illustrates a VPN record on a provisioning server, according to an embodiment.

FIG. 3B is a block diagram that illustrates a VPN record 320 on a provisioning server, according to an embodiment. In the illustrated embodiment, the record 320 includes three fields, a Router ID field 302, VC ID field 306, and an Other PE list field 324.

The Router ID field 302 and VC ID field 306 are as described above for the attachment circuit record 300. The value of the Router ID field 302 serves as a primary index, and the value of the VC ID field serves as a secondary index, to a particular VPN record 320 in the data stored on the RADIUS server.

The Other PE list field 324 holds data that indicates one or more provider edge nodes to which the edge node identified in Router ID field 302 forms pseudo wires to support the VC indicated in the VC ID field 306. For VPWS, the Other PE list 324 includes an identifier for a single PE different than the PE indicated by the Router ID field 302. In the example VPWS, VPN 100, the Other PE list field 324 for the record with Router ID value 1.1.1.1 (PE 120a) and VC ID corresponding to PW 140a holds data that indicates PE 120c. In the same example, the Other PE list field 324 for the record with Router ID value 1.1.1.3 (PE 120c) holds data that indicates PE 120a. For VPLS, the Other PE list 324 includes identifiers for all PEs on the VPN different than the PE indicated by the Router ID field 302. In the example VPLS, VPN 101, the Other PE list field 324 for the record with Router ID value 1.1.1.1 (PE 120a) and VC ID corresponding to VPN 101 with PWs 140a, 140c, 140e, holds data that indicates PE 120b and PE 120c.

According to a particular embodiment, a PE-Record attribute is added to the RADIUS attributes of RFC2865. The PE-Record attribute includes a first octet that indicates the type is a PE-Record, a second octet that indicate the length of the attribute, and length–2 octets that hold text that indicates the value of the PE-Record. The text is composed of two or three colon separated parts: a PE-Router-ID attribute (as described above); an attachment individual identifier (AII), and an optional list of pairs. The contents of the PE-Router attribute in the text of the PE-Record indicate a target provider edge node for a pseudo wire on the VPN of interest. The contents of the AII identify a particular attachment circuit on the target provider edge node. Any AII that is unique on the edge node indicated by the data in the PE-Router-ID may be used. Each pair in the optional list of pairs includes an attribute name and a value of attribute for a pseudo wire between the provider edge node identified in field 302 and the target provider edge node of the current PE-Record attribute. In some embodiments, the elements of each pair are separated by equals signs. For example, a per-hop-behavior value of 256 is indicated by the pair "PHB=256." It is assumed for purpose of illustration that PW 140a from source edge node 120a to target edge node 120c is switched to attachment circuit 122k that is identified on edge node 120c (IP address 1.1.1.3) as AII="2". In this illustration, an example PE-Record attribute for PW 140a is given by the octets Z.16.X.6.1.1.1.3.2.PHB=256, where the octet value "Z" indicates the type is a PE-Record, and "X" indicates the type is PE-Router-ID, as described above, and the octet value "16" indicates that there are 16 octets in this PE-Record.

In some embodiments, the Other PE List field 324 holds one or more of the RADIUS PE-Record attributes. The VC indicated in the VC ID field 306 includes one or more pseudo wires from a source provider edge node indicated in the Router ID field 302 and each target edge node included in the Other PE List 324.

According to a particular embodiment, an Attachment-Individual-ID attribute is added to the RADIUS attributes of RFC2865. The Attachment-Individual-ID attribute includes a first octet that indicates the type is an Attachment-Individual-ID, a second octet that indicate the length of the attribute, and a length-2 octet value that indicates the value, e,g, "2." For example, the value of Attachment-Individual-ID for attachment circuit 122j is given by the three octets "A.3.2," where the octet value "A" indicates the type is a Attachment-Individual-ID and is assigned by agreement of the RADIUS protocol authority or as a vendor-specific attribute. In some embodiments the Attachment-Individual-ID is used in the PE-Record. For example, the PE-Record attribute described above takes the form "Z.18.X.6.1.1.1.3.A.3.2.PHB=256" when the Attachment-Individual-ID attribute is used to describe the AII.

According to a particular embodiment, a Per-Hop-Behavior attribute is added to the RADIUS attributes of RFC2865. The Per-Hop-Behavior attribute includes a first octet that indicates the type is Per-Hop-Behavior, a second octet that indicate the length of the attribute is 6, and a four-octet value. The first two octets indicate the Per-Hop-Behavior value as described in RFC3140, the entire contents of which are hereby incorporated by references as if fully set forth herein.

For example, the value of Per-Hop-Behavior for attachment circuit 122j is given by the six octets "B.6.256," where the octet value "B" indicates the type is a Per-Hop-Behavior and is assigned by agreement of the RADIUS protocol authority or as a vendor-specific attribute. In some embodiments the Per-Hop-Behavior is used in the PE-Record. For example, the PE-Record attribute described above takes the form "Z.17.X.6.1.1.1.3.A.3.2.B.6.256" when the Attachment-Individual-ID attribute is used to describe the AII.

Figure 3C:
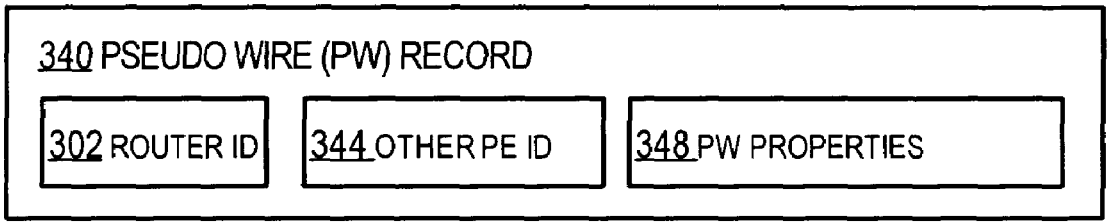
FIG. 3C is a block diagram that illustrates a pseudo wire record on a provisioning server, according to an embodiment.

FIG. 3C is a block diagram that illustrates a pseudo wire record 340 on a provisioning server, according to an embodiment. In the illustrated embodiment, the record 340 includes three fields, a Router ID field 302, an Other PE ID field 344, and a pseudo wire (PW) properties field 348.

The Router ID field 302 is as described above for both the attachment circuit record 300 and VPN record 320. The Router ID field 302 serves as a primary index to a particular PW record 340 in the data stored on the RADIUS server.

The Other PE ID field 344 holds data that indicates a target provider edge node for a particular pseudo wire. The Other PE ID field 344 serves as a secondary index to a particular PW record 340 in the data stored on the RADIUS server. In some embodiments, the field 344 includes just an identifier for the router. In some embodiments the field 344 includes also an identifier for a particular attachment circuit on the target router.

The PW properties field 348 holds data that indicate one or more properties of the PW that are used to configure a provider edge node to form the PW. For example, in some embodiments, the PW properties field includes data that indicates a control plane protocol (e.g., LDP) for negotiating the PW with the target provider edge node. In some embodiments, the PW properties field includes data that indicates a value of an EXP parameter (e.g., a hexadecimal value "3" designated "0x03") as described in RFC3032, cited above. In some embodiments, the PW properties field 348 includes one or more pairs of attributes and values as described above for the PE-Record attribute.

In some embodiments, the Other PE ID field 324 and PW properties field 348 are included in one RADIUS PE-Record attribute, in which the attribute-value pairs are not optional. For example, the PE-Router-ID and AII in the text octets of the PE-Record attribute form the Other PE ID field 344. The attribute-value pairs in the text octets of the PE-Record attribute form the PW Properties field 348.

An advantage of the data structures described above with reference to FIG. 3A, FIG. 3B and FIG. 3C, is that they allow the hierarchical relationships between attachment circuits, VPN edge node members and pseudo wires to be represented as flat files used by the RADIUS server. As described below, the configuration data stored in these data structures may be sent to a provider edge node in one or multiple different response messages. Another advantage of these data structures are that they are small and thus can be used to send incremental changes in configuration data to provider edge nodes.

In some embodiments, configuration data for one or more of these data structures, or their equivalents, are stored on different servers, including servers that are not RADIUS servers.

In another embodiment, data for two or more of these data structures are combined into the same data structure on the RADIUS or other server. An advantage of combining these data structures is that fewer operations are required on the server, including the RADIUS server, to retrieve the configuration data. Thus the combined data can be returned in one transaction without modifying the RADIUS server methods.

A disadvantage of combining these data structures is that data not relevant to a particular edge node is included in a record and retrieved. Thus, either the server or the receiving provider edge node consumes processing resources to filter out the unwanted information. If the receiving node does the filtering, then extra network resources are consumed to transmit the excess data.

Figure 3D:
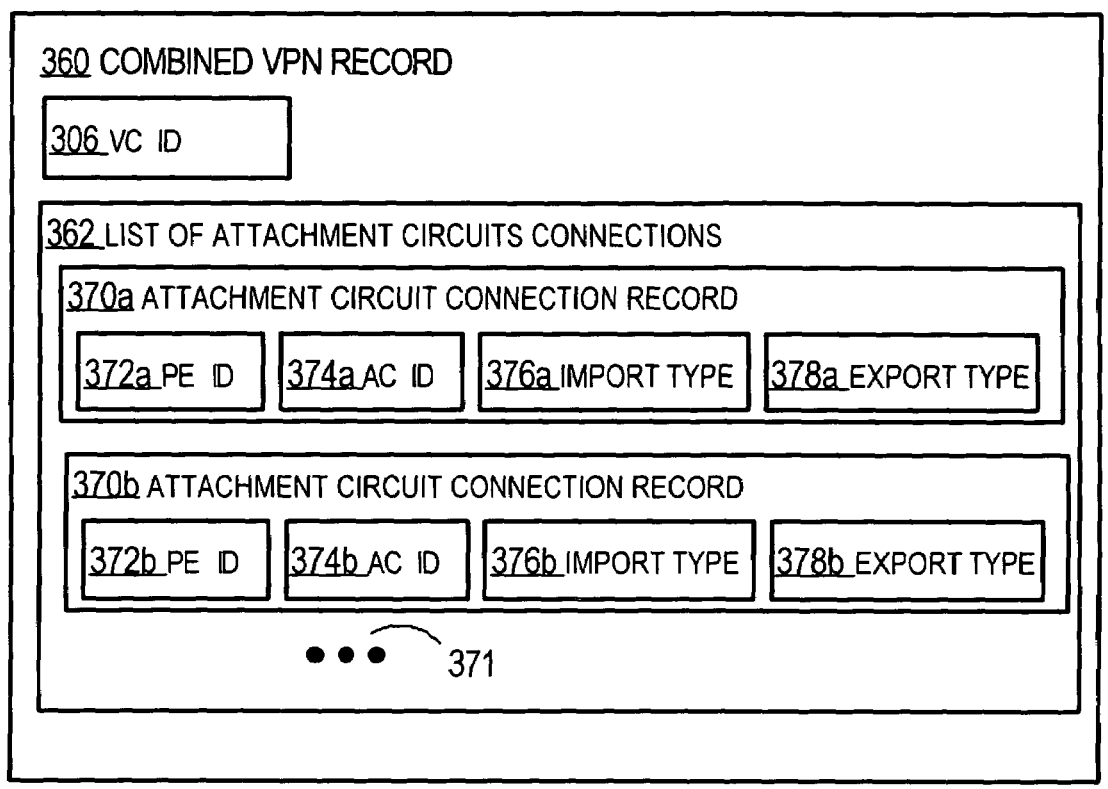
FIG. 3D is a block diagram that illustrates a combined VPN record on a provisioning server, according to an embodiment.

FIG. 3D is a block diagram that illustrates a combined VPN record 360 on a provisioning server, according to an embodiment. In the illustrated embodiment, the record 360 includes a VPN ID field 356 and a list 362 of attachment circuit connection records. The VPN ID field 356 holds data that indicates a VPN identifier from a customer's perspective. thus VPN ID field 356 indicates all the pseudo wires in both VPLS and VPWS VPNs. The list 362 of attachment circuit connection records includes attachment circuit connection records 370a, 370b and other attachment circuit connection records indicated by ellipsis 371 (collectively referenced herein as connection records 370).

Each connection record 370 uniquely identifies a source attachment circuit using a PE ID field 372a, 272b (and others, collectively referenced herein as PE ID fields 372) and an AC ID field 374a, 274b (and others, collectively referenced herein as AC ID fields 374). Any method may be used to identify the PE and AC. In some embodiments, the PE ID field 372 holds the RADIUS PE-Router-ID attribute, defined above; and the AC ID field 374 holds the RADIUS Attachment-Individual-ID attribute, also defined above.

Each connection record also includes an import type field 376a, 376b (and others, collectively referenced herein as import type field 376) and an export type field 378a, 378b (and others, collectively referenced herein as export type field 378). The import type field 376 and export type field 378 hold data that indicate to which remote provider edge node a particular attachment circuit should connect when that attachment circuit is the source. The type data in fields 376, 378 indicate that the associated attachment circuit is either a hub or a spoke in the VPN topology. As is well known in the art for BGP, a provider edge node functioning as a hub terminates multiple pseudo wires for a given VPN. For each remote provider edge participating in the VPN, there is exactly one pseudo wire between the hub provider edge and the remote provider edge. A provider edge functioning as a Spoke terminates exactly one pseudo wire to a remote hub provider edge for a given VPN. Import and export roles define whether a provider edge functions as a hub or a spoke and, as such, with what remote provider edges it must establish pseudo wires in order to build the L2VPN. In a hub and spoke environment, there must be only one Hub for any given VPN and the rest of the provider edges must be spokes. In a full-mesh environment, every provider edge operates as a hub.

It is assumed for purposes of illustration that the values in the fields of connection records for an example VPWS VPN are given in Table 1.

TABLE 1

Values of fields in an example list of attachment circuit connections

| record # | PE ID | AC ID | Import | Export |
|---|---|---|---|---|
| 1 | PE 120a | AC 122b | spoke | hub1 |
| 2 | PE 120a | AC 122c | spoke | hub2 |
| 3 | PE 120b | AC 122h | hub1 | spoke |
| 4 | PE 120c | AC 122j | hub2 | spoke |

When the configuration data of Table 1 is sent to PE 120c to configure AC 122j, record #4 indicates that AC 122j imports from a hub and exports to a spoke. To differentiate different source attachment circuits on the same PE from which AC 122j imports, hubs are distinguished by a suffix number. Thus AC 122j imports from hub2. In embodiments such as VPLS, where this distinction is not needed, the suffix number is omitted. To configure the switching of AC 122j, the other records depicted in Table 1 are inspected and those that do not export a hub2 are filtered out. Thus records #1 and #3 are filtered out, which leaves record #2 for AC 122c on PE 120a. Thus a PW is indicated that extends from AC 122j on PE 120c to AC 122c on PE 120a. Without the suffixes, a PW would also be established from AC 122j on PE 120c to AC 122b on PE 120a.

The data in the combined VPN record does not give PW properties. Thus, some additional data, such as PW records 340, is useful.

The combined VPN record 360 is most useful in VPLS where the topologies are almost exclusively "full-mesh" or "hub-and-spoke". When appling the combined VPN record 360 to VPWS, the topologies are typically not symmetric. As a result, each pseudo wire mapping must be defined as a separate "Hub" service. For example, the AC 122k, PE 120c to PE 120a, AC 122a connection may be described as "hubA". A different hub name must be applied to each AC-PE-PE-AC pseudo wire mapping service in the VPWS domain.

3.2 Method at a Radius Server for Provisioning a VPN

FIG. 2B is a flow diagram that illustrates at a high level a method 201 for provisioning a virtual private network at a RADIUS server, according to an embodiment. Method 201 is a particular embodiment of method 200. In an illustrated embodiment using data structures 300, 320, 340, three levels of authorization are supported, using three different types of users to index into the three record types. A primary index is based on the IP address of the provider edge node that sends the RADIUS authorization request. A secondary index is based on the contents of the RADIUS username attribute.

In step 211, configuration data is received and stored on a RADIUS server. For example, configuration data is received and stored in one or more of the data structures described above with reference to FIGS. 3A, 3B, 3C, 3D, using any of the methods described above with reference to step 210.

In step 221, a RADIUS authorization request is received at the RADIUS server. Step 221 is a particular embodiment of step 220. As is well known in the art, a RADIUS authorization request includes a user name field, the contents of which indicates the type of response that is appropriate. In an illustrated embodiment, the request is received from a PE (e.g., PE 120a) as the Network Access Server (NAS) running a RADIUS client. The IP address of the NAS sending the request is in the source IP address of the IP header for the RADIUS authorization request. For purposes of illustration, it is assumed that PE 120a with IP address 1.1.1.1 sends the request.

For purposes of illustration it is assumed that in a first example embodiment, the RADIUS user name field holds data that indicates a CE NAI for a VPLS, e.g., "providerX/atlantia@vpnY.domainZ.net." For purposes of illustration it is further assumed that in a second example embodiment, the RADIUS user name field holds data that indicates an AC ID on PE 120a for a VPWS, e.g., "ATM14.0.1" These two examples correspond to attachment circuit authorization.

In step 231, it is determined whether the user name indicates an attachment circuit. Step 231 is a particular embodiment of step 230. In an illustrated embodiment, the contents of the user name indicates an attachment circuit if those contents match the contents of an AC ID field 304 in a CE-AC attachment record 300 for the sending NAS. If it is determined that the user name holds data that indicates an attachment circuit, then control passes to step 241, described below. If not, then control passes to step 233 to determine whether the user name indicates a VC ID for a collection of one or more pseudo wires.

It is assumed for purposes of illustration that, in the first example of the illustrated embodiment, it is determined in step 231 that the user name "providerX/atlantia@vpnY.domainZ.net" matches a value in an AC ID field 304 of a particular record 300 for PE 120a, which has the IP address 1.1.1.1 in the router ID field 302. It is further assumed for purposes of illustration that, in the second example of the illustrated embodiment, it is determined in step 231 that the user name "ATM14.0.1" matches a value in an AC ID field 304 of a particular record 300 for PE 120a, which has the IP address 1.1.1.1 in the router ID field 302. In both examples, control then passes to step 241.

In step 241, a RADIUS authorization accept message is returned to the NAS (e.g., PE 120a). Step 241 is a particular embodiment of step 240. The authorization accept message includes data that indicates the contents of the VC ID field 306 and AC Service field 308, if any, of the record 300 that matches the router ID field 302 and AC ID field 304. It is assumed for purposes of illustration that, in the first example of the illustrated embodiment, for the associated record 300 with Router ID 1.1.1.1 and AC ID "providerX/atlantia@vpnY.domainZ.net", the contents of the VC ID field 306 indicate the collection of PWs 104a, 104c, 104e that make up VPN 101. It is further assumed for purposes of illustration that, in the second example of the illustrated embodiment, for the associated record 300 with Router ID 1.1.1.1 and AC ID "ATM14.0.1", the contents of the VC ID field 306 indicate the single PW 104a. In some embodiments, the VC ID is designated in the response message as the RADIUS VPN-ID attribute or the RADIUS Router-Distinguisher attribute, as can be determined by the RADIUS attribute type.

In some embodiments in which VC authorization, VPN authorization and PW authorization are performed separately, control passes from step 241 back to step 221 to recieve a different message before sending additional data to the requesting NAS (e.g., server 120a).

In some embodiments, control passes from step 241 to step 243 to automatically include, in the same or different authorization accept message, data that indicates target edge nodes associated with the VC ID sent in step 241. Step 243 is described in more detail below.

If it is determined in step 231, that the user name does not indicate an attachment circuit, control passes to step 233. In step 233, it is determined whether the user name indicates a VC ID for a collection of one or more pseudo wires. Step 233 is a particular embodiment of step 230. In an illustrated embodiment, the contents of the user name indicates a VC ID if those contents match the contents of a VC ID field 306 in a VPN record 320 for the sending NAS. If it is determined that the user name holds data that indicates the VC ID, then control passes to step 243, described below. In some embodiments, the VC ID is designated in the user name field or elsewhere in the request message as the RADIUS VPN-ID attribute or the RADIUS Router-Distinguisher attribute, as can be determined by the RADIUS attribute type. If the request does not include a VC ID, then control passes to step 235 to determine whether the user name indicates a particular target edge node to which a pseudo wire is to be formed.

In step 243, a RADIUS authorization accept message is returned to the NAS (e.g., PE 120a). Step 243 is a particular embodiment of step 240. The authorization accept message includes data that indicates the contents of the Other PE list 324 of the record 320 that matches the router ID field 302 and VC ID field 306. It is assumed for purposes of illustration that, in a third example of the illustrated embodiment, for the associated record 320 with Router ID 1.1.1.1 and VC ID for VPN 101, the contents of the Other PE list 324 indicate the collection of target PEs, 120b, 120c. It is further assumed for purposes of illustration that, in a fourth example of the illustrated embodiment, for the associated record 320 with Router ID 1.1.1.1 and VC ID for 140a, the contents of the Other PE list 324 indicate the single target PE 120c of PW 104a. In some embodiments, the Other PE list is designated in the response message as the RADIUS PE-record attribute, as can be determined by the RADIUS attribute type.

In some embodiments, control passes from step 243 back to step 221. In some embodiments, control passes from step 243 to step 245 to automatically include, in the same or different authorization accept message, data that indicates pseudo wire properties associated with the PW (e.g., PW 140a) to the target PE (e.g., 120c) indicated in step 243. Step 245 is described in more detail below.

If it is determined in step 233, that the user name does not indicate a VC ID for a collection of one or more pseudo wires either, then control passes to step 235. In step 235, it is determined whether the user name indicates a PE ID for a target of a pseudo wire. Step 235 is a particular embodiment of step 230. In an illustrated embodiment, the contents of the user name indicates a PE ID if those contents match the contents of a Other PE ID field 306 in a PW record 340 for the sending NAS. If it is determined that the user name holds data that indicates the Other PE ID, then control passes to step 245, described below. If not, then control passes to step 250 to continue processing the RADIUS request. If no match is found for any user name in the RADIUS database during step 250, then a radius authorization accept message is not sent. In some embodiments, the Other PE ID field is designated in the response message as the new RADIUS PE-router-ID attribute, as can be determined by the RADIUS attribute type In step 245, a RADIUS authorization accept message is returned to the NAS (e.g., PE 120a). Step 245 is a particular embodiment of step 240. The authorization accept message includes data that indicates the contents of the PW properties field 348 of the PW record 340 that matches the router ID field 302 and Other Pe id field 344. It is assumed for purposes of illustration that, in a fifth example of the illustrated embodiment, for the associated record 340 with Router ID 1.1.1.1 and Other PE ID for 120c, the contents of the PW properties field 348 indicate the level of service for each hop to along PW140a. Similarly, for the associated record 340 with Router ID 1.1.1.1 and Other PE ID for 120c, the contents of the PW properties field 348 indicate the level of service for each hop along PW 140a. In some embodiments, the PW properties are designated in the response message as the RADIUS PE-record attribute or the new RADIUS Per-Hop-Behavior attribute, as can be determined by the RADIUS attribute type In some embodiments, control passes from step 245 back to step 221. In some embodiments, control passes from step 245 to step 250.

It is reiterated, as stated above, that in some embodiments in which VC authorization, VPN authorization and PW authorization are performed separately, control passes from steps 241 and 243 back to step 221 to recieve a different message before sending additional data to the requesting NAS (e.g., server 120a). While, in some embodiments, control passes from step 241 to step 243 to 245 to automatically include, in the same or different authorization accept message, data that indicates additional configuration data for each attachment circuit or provider edge.

It is also noted, that the order described in FIG. 2B is changed in different embodiments. For example, in some embodiments, described in more detail below with reference to FIG. 4C, authorization acceptance messages are first sent in steps 241 and 343 that include data for provisioning one or more pseudo wires before an association is made between the pseudo wire and one or more attachment circuits. In some such embodiments, a request is received in step 221 that includes a PE ID for a provider edge node serving as the NAS. Data from VC ID field 306 and Other PE list 324 are sent to the requesting node based on one or more VPN records 320 that have contents in Router ID field 302 that match the PE ID of the PE serving as the requesting NAS. Data for a particular attachment circuit, e.g., data in AC service field 308, and associations between an AC ID and VC ID from record 300, are delayed until the involved attachment circuit becomes active, and a message is received that identifies an AC ID to match with the AC ID field 304 in one or more records 300.

4.0 Method at Provider Edge for Provisioning a VPN

Figure 4A:
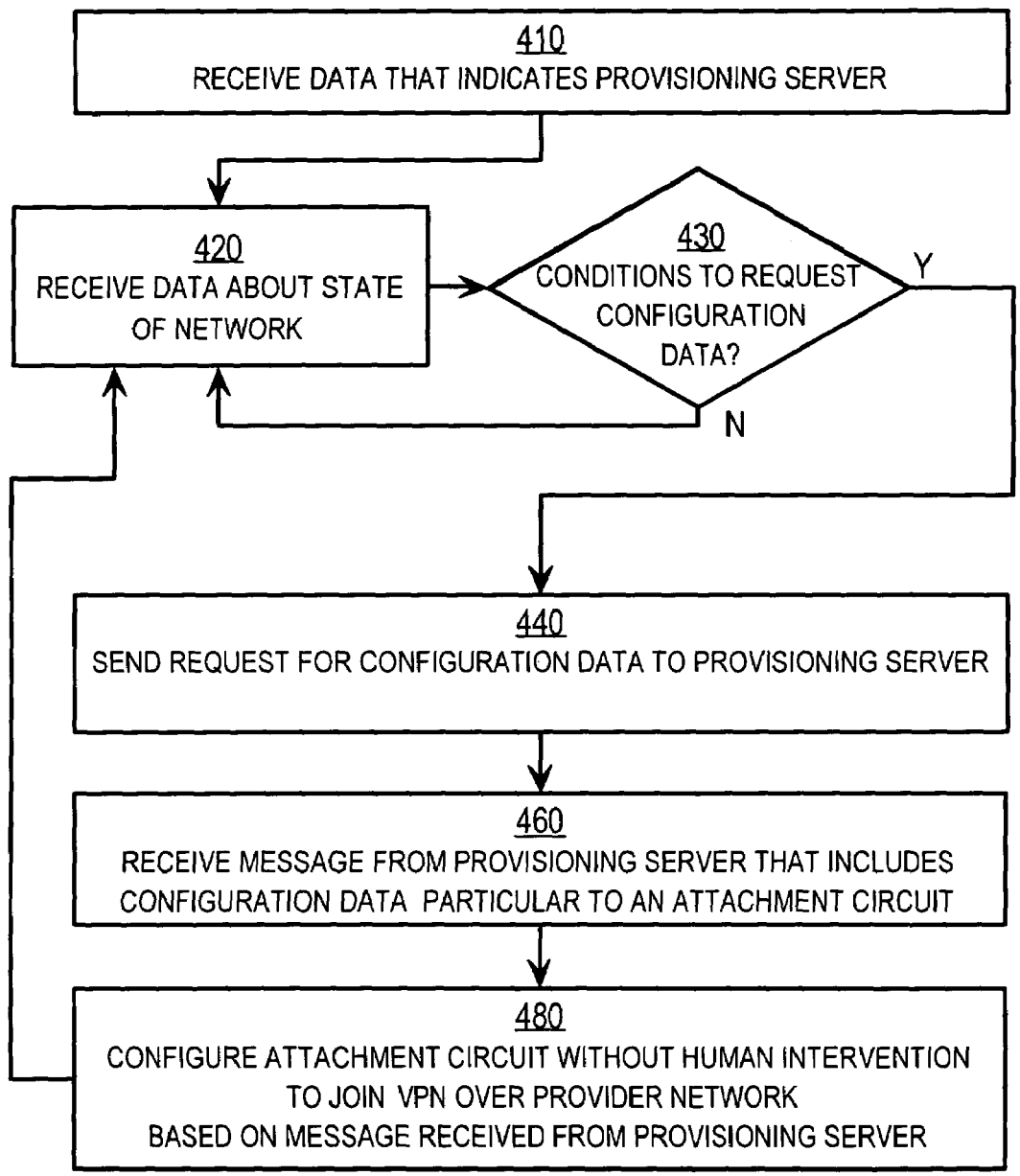
FIG. 4A is a flow diagram that illustrates at a high level a method for provisioning a virtual private network at a provider edge node, according to an embodiment.

FIG. 4A is a flow diagram that illustrates at a high level a method 400 for provisioning a virtual private network at a provider edge node, according to an embodiment.

In step 410, minimal configuration data is received at the provider edge node (e.g., PE 120a). The minimum configuration data indicates an identifier for a remote server that dispenses configuration data for one or more VPNs on demand. For example, the minimal configuration data indicates the IP address or DSN name for server 130. Any method may be used to receive the minimal configuration data, as described above for step 210.

In step 420, data is received that indicates the state of the network. Any method may be used to receive the network state data, as described above for step 210. In an illustrated embodiment, step 420 includes receiving one or more data packets on an attachment circuit (e.g., AC 122c) connected directly to the provider edge (e.g., PE 120a).

In step 430, it is determined whether conditions are satisfied to request configuration data from a remote server. For example, in some embodiments, a customer subscribes to a VPN service on the provider's public web site, and the conditions are satisfied when the web site server sends a message to the provider edge node. For, example, configuration data is not requested from server 130 whenever data packets are received on an attachment circuit (e.g., AC 122c). Instead, in this example, step 430 includes determining whether the data packets indicate a first sign of life (FSOL) on the attachment circuit. Examples of FSOL include an ATM switched virtual circuit autodiscovery message. Any method to distinguish the FSOL on a physical or logical attachment circuit may be used. In some embodiments, particular methods to determine FSOL are used. When the FSOL is detected, then conditions are satisfied to request configuration data and control passes to step 440. Otherwise control passes back to step 420 to continue to monitor data about the state of the network.

In step 440, one or more requests for configuration data are sent to a remote provisioning server, e.g., server 130. Any appropriate protocol may be used to send the request. In various embodiments, the one or more requests are SNMP messages or BGP messages or messages of other protocols. In an illustrated embodiment, described in more detail below, one or more requests are RADIUS protocol authorization requests.

In step 460, one or more messages are received from the provisioning server (e.g.:, server 130), either directly or indirectly, in response to sending the one or more requests in step 440. The received message includes configuration data for a particular attachment circuit or provider edge node. In various embodiments, the one or more response messages are SNMP messages or BGP messages or messages of other protocols. In an illustrated embodiment, described in more detail below, one or more responses are RADIUS protocol authorization acceptance messages.

In step 480, an attachment circuit or provider edge node is configured without human intervention to join a VPN over the provider PSN, based on the data in the message received in step 460. Any method may be used to configure the provider edge node or attachment circuit, including, but not limited to executing CLI, interpreting byte code instructions of an open language, and executing machine code.

5.0 Method at Provider Edge for Provisioning a VPN With Radius

Figure 4B:
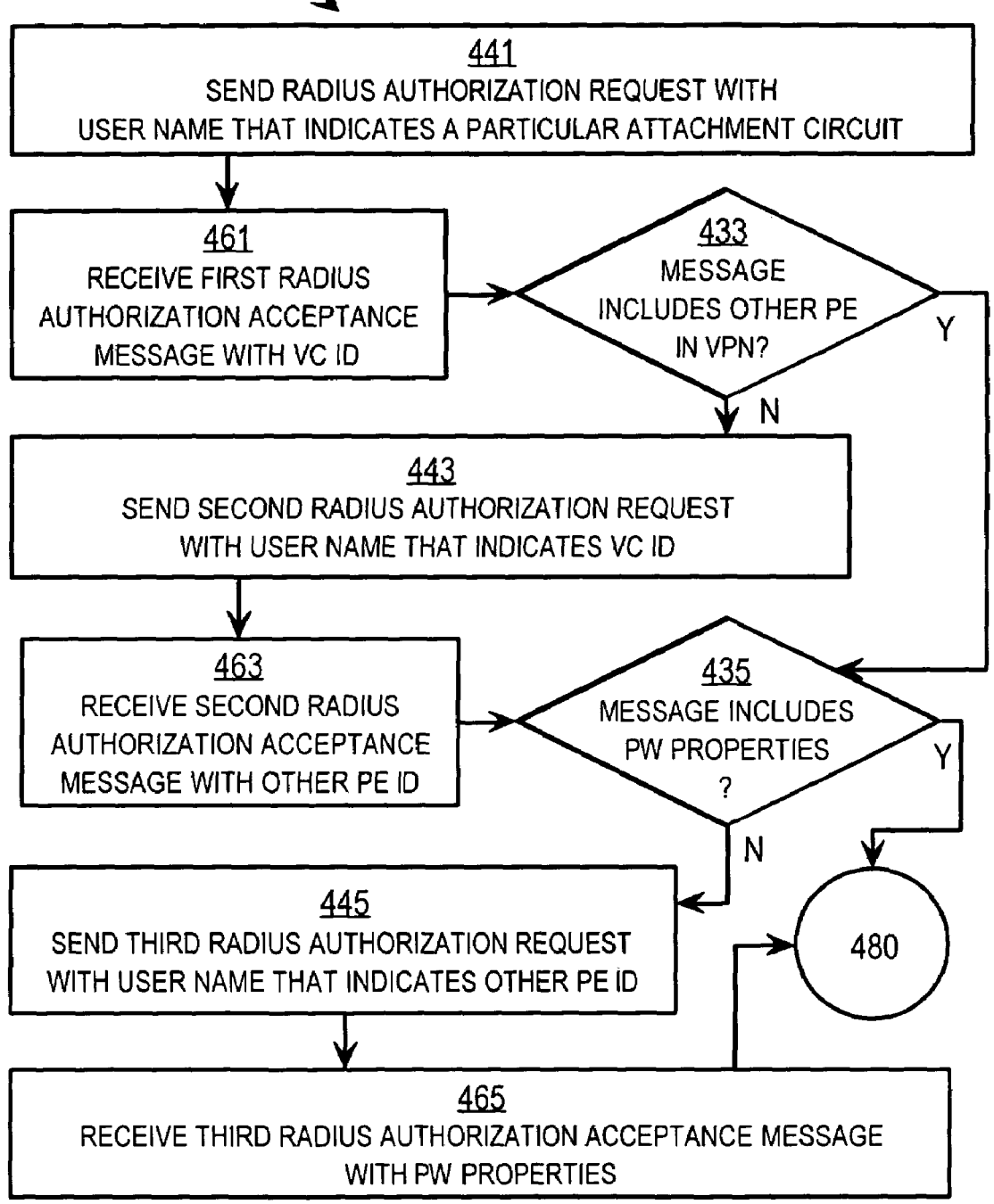
FIG. 4B is a flow diagram that illustrates at a high level a method for provisioning a virtual private network at a provider edge node using a RADIUS server, according to an embodiment.

FIG. 4B is a flow diagram that illustrates at a high level a method 401 for provisioning a virtual private network at a provider edge node using a RADIUS server, according to an embodiment.

In step 441, a provider edge node, e.g., PE 120*a*, sends a RADIUS authorization request to a remote RADIUS server. The request includes a user name field that holds data that indicates a particular attachment circuit, customer equipment, or provider edge node. Step 441 is a particular embodiment of step 440. The IP address of the sending provider edge node (e.g., PE 120*a*) appears in the source IP address. In some embodiments, the identifier for the sending PE is held explicitly in a RADIUS attribute, such as the new RADIUS PE-Address attribute. In some embodiments, an AC ID is designated by the new RADIUS Attachment-Individual-ID attribute, described above, as determined by the RADIUS attribute type.

In some embodiments, the request includes a password field that holds data that indicates a password that authenticates the message as originating from provider equipment (including PSN 110 in general, or provider edge nodes 120 more specifically, or a particular PE, e.g., PE 120*a*).

In response, during step 461, the provider edge node receives a first RADIUS authorization acceptance message that contains one or more VC IDs. In the illustrated embodiment, the presence of the VC ID is indicated by the VC IC type, as described above for new RADIUS attributes VPN-ID and Router-Distinguisher, in the message. The VC ID indicates an entire VPN (one or more pseudo wires) for VPLS, and a single pseudo wire for VPWS. Step 461 is a particular embodiment of step 460.

In step 433, it is determined whether the response message includes Other PE that are targets of the PW indicated by the VC ID. If not, control passes to step 443 to send another message. Step 433 is part of a particular implementation of step 430. If the first message includes the VC ID, control passes to step 435.

In step 443, a provider edge node, e.g., PE 120*a*, sends a RADIUS authorization request to the remote RADIUS server. The request includes a user name field that holds data that indicates a particular VC ID. Step 443 is a particular embodiment of step 440. The IP address of the sending provider edge node (e.g., PE 120*a*) appears in the source IP address. In some embodiments, the identifier for the sending PE is held explicitly in a RADIUS attribute, such as the new RADIUS PE-Address attribute. In the illustrated embodiment, the presence of the VC ID is indicated by the VC ID type in the message, as described above for new RADIUS attributes VPN-ID and Router-Distinguisher.

In response, during step 463, the provider edge node receives a second RADIUS authorization acceptance message that contains one or more Other PE IDs. In the illustrated embodiment, the presence of each Other PE ID is indicated by a PE ID type, as described above for new RADIUS attribute PE-record, in the message. The PE ID indicates an target provider edge node for a partiuclar pseudo wire. Step 463 is a particular embodiment of step 460.

In step 435, it is determined whether the response message includes PW properties for the PW. If not, control passes to step 445 to send another message. In some embodiments, PW properties are found in the response message as new RADUS attributes PE-record or Per-Hop-Behavior, as described above. Step 435 is part of a particular implementation of step 430. If the first or second message includes the Other PE IDs, control passes to step 480 to configure the provider edge node to have the attachment circuit join a VPN.

In step 445, a provider edge node, e.g., PE 120*a*, sends another RADIUS authorization request to the remote RADIUS server. The request includes a user name field that holds data that indicates a particular target provider edge for a pseudo wire. Step 445 is a particular embodiment of step 440. The IP address of the sending provider edge node (e.g., PE 120*a*) appears in the source IP address. In some embodiments, the identifier for the sending PE is held explicitly in a RADIUS attribute, such as the new RADIUS PE-Address attribute. In the illustrated embodiment, the presence of the Other PE ID is indicated by the Other PE type in the message, as described above for new RADIUS attributes PE-record and PE-Address.

In response, during step 465, the provider edge node receives a third RADIUS authorization acceptance message that contains PW properties for one or more PWs. In tsome embodiments, the presence of eW properties is indicated by new RADIUS attributes for a PE-record or a Per-Hop-Behavior, as described above, in the message. Step 465 is a particular embodiment of step 460.

According to the method 401, interacting with a method 201 on a remote RADIUS server, configuration data in the three records 300, 320, 340 is passed from the RADIUS server to a provider edge node (e.g., PE 120*a*) in one, two or three transactions with a RADIUS server.

In some embodiments. extra information is included in the one or more messages from the RADIUS server. For example, the message includes both the Other PE list and the router ID of the requesting PE. Either the RADIUS server or the receiving PE then filters out the excess information.

In other embodiments, one or more of the messages and responses are directed to and received from servers that are not RADIUS servers. For example, in some embodiments, step 443 directs a second message to a BGP server, or its proxy, and receives a second acceptance message from that BGP server. Similarly, in some embodiments step 445 directs a third message to a different server, or its proxy, such as an SNMP server; and receives a third acceptance message from the different server, or a proxy.

Figure 4C:
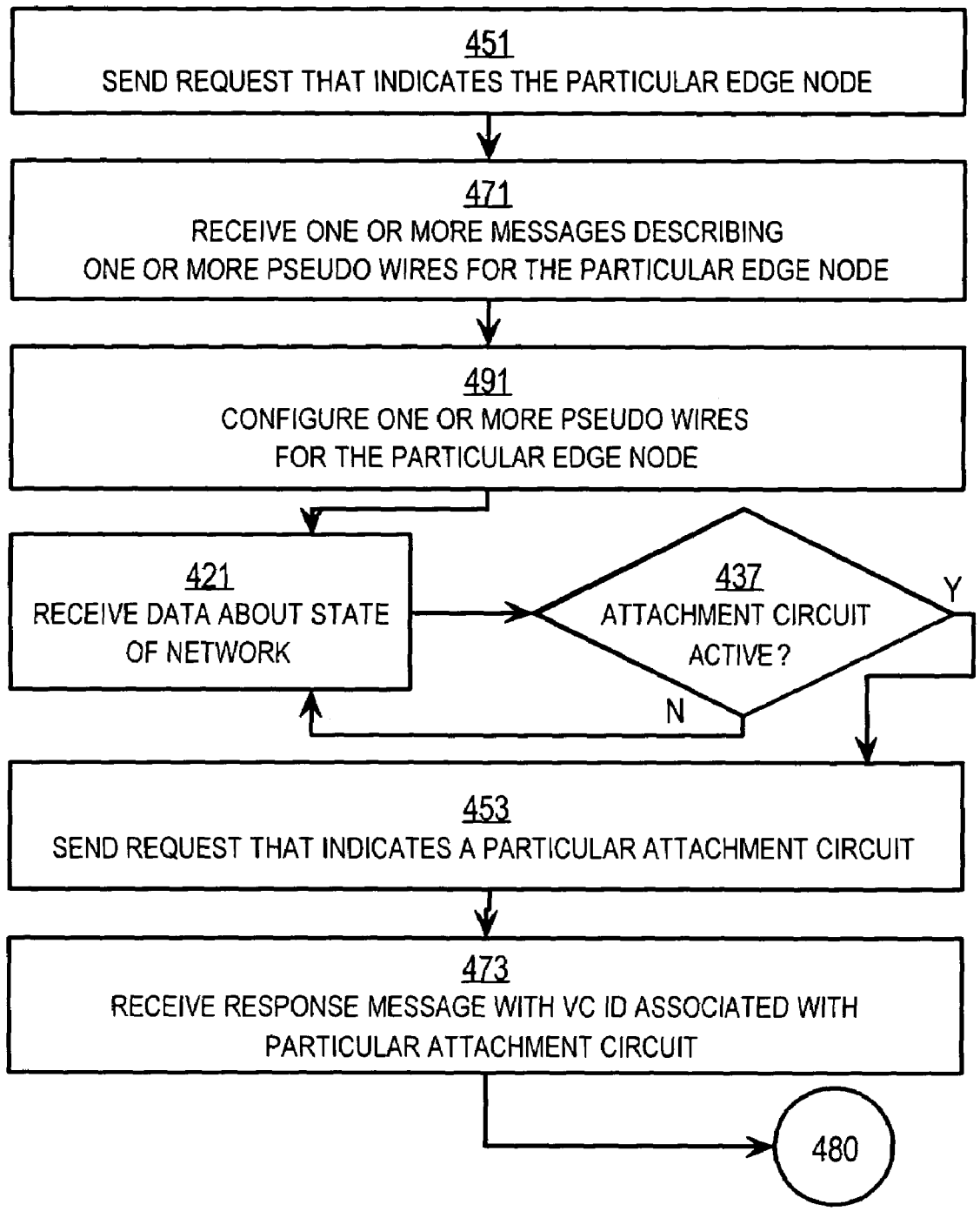
FIG. 4C is a flow diagram that illustrates at a high level a method for provisioning a virtual private network at a provider edge node using a provisioning server, according to another embodiment.

FIG. 4C is a flow diagram that illustrates at a high level a method 403 for provisioning a virtual private network at a provider edge node using a provisioning server, according to another embodiment. In method 403, the pseudowires are provisioned among two or more provider edge nodes, before an attachment circuit becomes available to join a VPN.

In step 451, a request is sent that indicates a particular edge node to a server. In some embodiments the request is a RADIUS authorization request directed to a RADIUS server.

In response, during step 471, one or more messages are received that describe one or more pseudo wires between the particular edge node and one or more other provider edge nodes. Step 471 is a particular embodiment of step 460. For example, PE 120a, receives messages indicating two pseudo wires 140c, 140d are to be set up between PE 120a and PE 120b, and two more pseudo wires 140a, 140b are to be set up between PE 120a and PE 120c, to support VPWS VPN 100. This can be done even before any or all of ACs 122a, 122b, 122c, 122d, 122f, 122g, 122h, 122i, 122j, 122k become active. In some embodiments the response messages are RADIUS authorization acceptance messages.

In step 491, one or more of the pseudo wires are established among the provider edge nodes. Step 491 is a particular embodiment of step 480. For example, PE 120a advertises to PE 120b two PWs 140c, 140d; and advertises to PE 120c two other PWs 140a, 140b. This also can be done even before any or all of ACs 122a, 122b, 122c, 122d, 122f, 122g, 122h, 122i, 122j, 122k become active.

In step 421, data is received about a state of the network. Step 421 is a particular embodiment of step 420. For example, signals are monitored by PE 120a on attachment circuits 122a, 122b, 122c, 122d, 122e.

In step 437 it is determined whether an attachment circuit has become active for the first time after being inactive. If so control passes to step 453; if not control passes back to step 421 to monitor the network. Step 437 is a particular embodiment of step 430. For example, if it is determined in step 437 that attachment circuit 122c has become active, control passes to step 453.

In step 453, a request is sent that indicates the particular attachment circuit to a configuration server. Step 453 is a particular embodiment of step 440. In some embodiments the request is a RADIUS authorization request directed to a RADIUS server.

In response, during step 473, one or more messages are received that describe one or more pseudo wires to which the attachment circuit is joined. Step 473 is a particular embodiment of step 460. In some embodiments the response messages are RADIUS authorization acceptance messages. For example, PE 120a receives messages indicating that AC 122c is to be switched to PW 140b.

Control then passes to step 480 to configure PE 120a to join AC 122c to PW 140b. For example, PE 120a sends an advertisement to PE 120c that PW 140b is connected to AC 122c. In some embodiments, the configuration data received in step 473 includes identification of the target AC 122j for PW 140b, and the advertisement includes this information, using single-sided signaling. In other embodiments, the target AC 122j is not identified in the advertisement. If the target AC 122j is not yet active, the target PE 120c stores the advertisement until AC 122j becomes active. When AC 122j becomes active, PE 120c then sends a request to server 130 to obtain configuration data that indicates AC 122j is to be switched to PW 140b toward PE 120a. An advertisement is then sent from PE 120c to PE 120a indicating PW 140b is connected to AC 122j. Thus PEs 120a, 120c are configured to form PW 140b to join AC 122c to AC 122j when those ACs come active, without human intervention.

2.0 Implementation Mechanisms—Hardware Overview

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0,1w) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention.

Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

3.0 Extensions and Alternatives

In this specification and Appendix, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for configuring a network interface on an intermediate network node at an edge of a provider network to support a virtual private network, comprising the steps of:
   storing at a server on a host computer on a provider network configuration data that indicates, for a particular virtual private network over the provider network, properties for an interface for a direct communication link to a customer network node outside the provider network,
   determining whether conditions are satisfied for sending the configuration data to a particular node at an edge of the provider network; and
   if it is determined that conditions are satisfied for sending the configuration data, then sending at least some of the configuration data to the particular node to cause the particular node to configure a particular interface without human intervention for the particular virtual private network over the provider network based on the configuration data,
   wherein:
      the provider network is a packet-switched network;
      the particular virtual private network is a link layer virtual private network;
      the particular node is different from the host; and
      the particular interface is for a direct communication link to a customer network node outside the provider network.

2. A method as recited in claim 1, said step of determining whether conditions are satisfied for sending the configuration data further comprising determining whether a request message is received from the particular node.

3. A method as recited in claim 1, wherein the particular interface is a virtual circuit of a plurality of virtual circuits on the same physical circuit.

4. A method as recited in claim 1, wherein the particular interface is a physical circuit.

5. A method as recited in claim 1, said step of determining whether conditions are satisfied for sending the configuration data further comprising determining whether a request message is received from the particular node in response to a change at the particular node.

6. A method as recited in claim 1, wherein the configuration data includes a mapping between a customer identification for the particular interface and a particular virtual private network.

7. A method as recited in claim 1, wherein the configuration data includes values for service parameters that are specific to the particular interface.

8. A method as recited in claim 1, wherein the configuration data includes values for the type of virtual private network among a plurality of types that include at least two of a virtual private wire service (VPWS), a virtual private local area network service (VPLS) and an inter-local access and transport area private line service (IPLS).

9. A method as recited in claim 1, wherein the configuration data includes a mapping between the particular virtual private network and a different node on the edge of the provider network to which the particular node should establish a tunnel for the particular private network.

10. A method as recited in claim 1, wherein the configuration data includes a property for a tunnel for the particular virtual private network from the particular node to a different node on an edge of the provider network from a plurality of properties that include at least one of an identifier for the tunnel and a service level for traffic through the tunnel.

11. A method as recited in claim 1, wherein the configuration data sent to the particular node is less than all configuration data for provisioning all interfaces on the particular node.

12. A method as recited in claim 1, wherein the configuration data sent to the particular node is less than all configuration data for provisioning all interfaces that belong to the particular virtual private network on the particular node for the particular node.

13. A method as recited in claim 1, wherein the server is a Remote Access Dial-In Service (RADIUS) Server.

14. A method as recited in claim 13, said step of sending the configuration data further comprises sending a RADIUS authentication acceptance response that includes a RADIUS attribute for a virtual private network identification that indicates a collection of one or more tunnels for the particular virtual private network on the provider network.

15. A method as recited in claim 14, said step of determining whether conditions are satisfied for sending the configuration data further comprising determining whether a RADIUS user authentication request message is received from the particular node, which request includes a RADIUS user name attribute with data that indicates an interface name.

16. A method as recited in claim 14, said step of determining whether conditions are satisfied for sending the configuration data further comprising determining whether a RADIUS user authentication request message is received from the particular node, which request includes a RADIUS user name attribute with data that indicates a network access identifier (NAI) associated with the customer network node.

17. A method as recited in claim 13, said step of sending the configuration data further comprises sending a RADIUS authentication acceptance response that includes a RADIUS attribute for an attachment identification that indicates both an identification for the particular virtual private network to which the particular interface belongs and an interface identification that uniquely indicates the particular interface among interfaces that belong to the particular virtual private network.

18. A method as recited in claim 13, wherein the configuration data includes a RADIUS attribute for a different node on the edge of the provider network that is different from the particular node and that is included in the particular virtual private network.

19. A method as recited in claim 18, said step of determining whether conditions are satisfied for sending the configuration data further comprising determining whether a RADIUS user authentication request message is received from the particular node, which request includes a RADIUS user name attribute with data that indicates the particular virtual private network.

20. A method as recited in claim 13, wherein the configuration data includes a RADIUS attribute for a tunnel from the particular node to a different node on the edge of the provider network.

21. A method as recited in claim 20, said step of determining whether conditions are satisfied for sending the configuration data further comprising determining whether a RADIUS user authentication request message is received from the particular node, which request includes a RADIUS user name attribute with data that indicates the different node on the edge of the provider network.

22. A method as recited in claim 1, wherein the server is a Simple Network Management Protocol (SNMP) Server.

23. A method for configuring a network interface on an intermediate network node at an edge of a provider network to support a virtual private network, comprising the steps of:
   determining on a particular node at an edge of a provider network whether conditions are satisfied for configuring a particular interface on the particular node for a virtual private network over the provider network;
   if it is determined that conditions are satisfied, then sending, to a first server on a first host computer of the provider network, interface identification data that uniquely indicates the particular interface;
   in response to sending the interface identification data, receiving from a second server on a second host computer of the provider network configuration data that indicates, for the virtual private network, properties for the particular interface; and
   configuring the particular interface for the virtual private network based on the configuration data without human intervention,
   wherein
      the provider network is a packet-switched network;
      the particular virtual private network is a link layer virtual private network;
      the particular node is different from the first host and the second host; and
      the particular interface is for a direct communication link to a customer network node outside the provider network.

24. A method as recited in claim 23, wherein the first server is the same as the second server.

25. A method as recited in claim 23, further comprising receiving data at the particular node that indicates an address on the provider network for the first server.

26. A method as recited in claim 23, wherein the particular interface is a virtual circuit of a plurality of virtual circuits on the same physical circuit.

27. A method as recited in claim 23, wherein the particular interface is a physical circuit.

28. A method as recited in claim 23, said step of determining whether conditions are satisfied for configuring the particular interface further comprising determining whether a particular signal is received on the particular interface.

29. A method as recited in claim 23, said step of determining whether conditions are satisfied for configuring the particular interface further comprising determining whether a message that indicates the particular interface is received from a third server on a third host computer of the provider network, wherein the particular node is different from the third host.

30. A method as recited in claim 23, wherein the first server is a Remote Access Dial-In Service (RADIUS) Server and the second server is the RADIUS server.

31. A method as recited in claim 30, said step of sending the interface identification data further comprises sending a RADIUS authentication request that includes a RADIUS user name attribute with data that indicates at least one of a unique name for the particular interface and a unique name for customer equipment to which the particular interface is directly linked.

32. A method as recited in claim 30, said step of receiving the configuration data further comprising receiving a RADIUS authentication acceptance response that includes a RADIUS attribute for a virtual private network identification that indicates a collection of one or more tunnels for the particular virtual private network.

33. A method as recited in claim 32, said step of receiving configuration data further comprising:
   determining whether the RADIUS authentication acceptance response includes data that indicates a different node at an edge of the provider network; and
   if it is determined that the RADIUS authentication acceptance response does not include data that indicates the different node, then performing the steps of
      sending a RADIUS authentication request that includes a RADIUS user name attribute with data that indicates the virtual private network identification, and
      receiving another RADIUS authentication acceptance response that includes a RADIUS attribute with node identification data that indicates the different node.

34. A method as recited in claim 32, said step of receiving configuration data further comprising:
   determining whether the RADIUS authentication acceptance response includes data that indicates a property of a tunnel from the particular node to a different node at an edge of the provider network; and if it is determined that the RADIUS authentication acceptance response does not include data that indicates the property of the tunnel, then performing the steps of
sending a RADIUS authentication request that includes a RADIUS user name attribute with data that indicates the different node, and
receiving another RADIUS authentication acceptance response that includes a RADIUS attribute with data that indicates a property of the tunnel.

35. A method as recited in claim 30, said step of receiving the configuration data further comprises receiving a RADIUS authentication acceptance response that includes a RADIUS attribute for an attachment identification that indicates both an identification for the particular virtual private network to which the particular interface belongs and an interface identification that uniquely indicates the particular interface among interfaces that belong to the particular virtual private network.

36. An apparatus for configuring a network interface on an intermediate network node at an edge of a provider network to support a virtual private network, comprising:
means for storing at a server on a host computer on a provider network configuration data that indicates, for a particular virtual private network over the provider network, properties for an interface for a direct communication link to a customer network node outside the provider network,
means for determining whether conditions are satisfied for sending the configuration data to a particular node at an edge of the provider network; and
means for sending at least some of the configuration data to the particular node to cause the particular node to configure a particular interface without human intervention for the particular virtual private network over the provider network based on the configuration data, if it is determined that conditions are satisfied for sending the configuration data,
wherein:
the provider network is a packet-switched network;
the particular virtual private network is a link layer virtual private network;
the particular node is different from the host; and
the particular interface is for a direct communication link to a customer network node outside the provider network.

37. An apparatus for configuring a network interface on an intermediate network node at an edge of a provider network to support a virtual private network, comprising:
means for determining on a particular node at an edge of a provider network whether conditions are satisfied for configuring a particular interface on the particular node for a virtual private network over the provider network;
means for sending, to a first server on a first host computer of the provider network, interface identification data that uniquely indicates the particular interface, if it is determined that conditions are satisfied;
means for receiving from a second server on a second host computer of the provider network configuration data that indicates, for the virtual private network, properties for the particular interface, in response to sending the interface identification data; and
means for configuring the particular interface for the virtual private network based on the configuration data without human intervention,
wherein
the provider network is a packet-switched network;
the particular virtual private network is a link layer virtual private network;
the particular node is different from the first host and the second host; and
the particular interface is for a direct communication link to a customer network node outside the provider network.

38. An apparatus for configuring a network interface on an intermediate network node at an edge of a provider network to support a virtual private network, comprising:
a network interface that is coupled to a provider network for communicating therewith a data packet;
one or more processors;
a computer-readable medium; and
one or more sequences of instructions stored in the computer-readable medium, which, when executed by the one or more processors, causes the one or more processors to carry out the steps of:
storing configuration data that indicates, for a particular virtual private network over the provider network, properties for an interface for a direct communication link to a customer network node outside the provider network;
determining whether conditions are satisfied for sending the configuration data to a different node at an edge of the provider network; and
if it is determined that conditions are satisfied for sending the configuration data, then sending at least some of the configuration data to the different node to cause the different node to configure a particular interface without human intervention for the particular virtual private network over the provider network based on the configuration data,
wherein:
the provider network is a packet-switched network;
the particular virtual private network is a link layer virtual private network; and
the particular interface is for a direct communication link to a customer network node outside the provider network.

39. An apparatus as recited in claim 38, said step of determining whether conditions are satisfied for sending the configuration data further comprising determining whether a request message is received from the particular node.

40. An apparatus as recited in claim 38, wherein the particular interface is a virtual circuit of a plurality of virtual circuits on the same physical circuit.

41. An apparatus as recited in claim 38, wherein the particular interface is a physical circuit.

42. An apparatus as recited in claim 38, said step of determining whether conditions are satisfied for sending the configuration data further comprising determining whether a request message is received from the particular node in response to a change at the particular node.

43. An apparatus as recited in claim 38, wherein the configuration data includes a mapping between a customer identification for the particular interface and a particular virtual private network.

44. An apparatus as recited in claim 38, wherein the configuration data includes values for service parameters that are specific to the particular interface.

45. An apparatus as recited in claim 38, wherein the configuration data includes values for the type of virtual private network among a plurality of types that include at least two of a virtual private wire service (VPWS), a virtual private local area network service (VPLS) and an inter-local access and transport area private line service (IPLS).

46. An apparatus as recited in claim 38, wherein the configuration data includes a mapping between the particular virtual private network and a different node on the edge of the provider network to which the particular node should establish a tunnel for the particular private network.

47. An apparatus as recited in claim 38, wherein the configuration data includes a property for a tunnel for the particular virtual private network from the particular node to a different node on an edge of the provider network from a plurality of properties that include at least one of an identifier for the tunnel and a service level for traffic through the tunnel.

48. An apparatus as recited in claim 38, wherein the configuration data sent to the particular node is less than all configuration data for provisioning all interfaces on the particular node.

49. An apparatus as recited in claim 38, wherein the configuration data sent to the particular node is less than all configuration data for provisioning all interfaces that belong to the particular virtual private network on the particular node for the particular node.

50. An apparatus as recited in claim 38, wherein execution of the one or more sequences of instructions further causes the one or more processors to carry out the steps of a Remote Access Dial-In Service (RADIUS) Server.

51. An apparatus as recited in claim 50, said step of sending the configuration data further comprises sending a RADIUS authentication acceptance response that includes a RADIUS attribute for a virtual private network identification that indicates a collection of one or more tunnels for the particular virtual private network on the provider network.

52. An apparatus as recited in claim 51, said step of determining whether conditions are satisfied for sending the configuration data further comprising determining whether a RADIUS user authentication request message is received from the particular node, which request includes a RADIUS user name attribute with data that indicates an interface name.

53. An apparatus as recited in claim 51, said step of determining whether conditions are satisfied for sending the configuration data further comprising determining whether a RADIUS user authentication request message is received from the particular node, which request includes a RADIUS user name attribute with data that indicates a network access identifier (NAI) associated with the customer network node.

54. An apparatus as recited in claim 50, said step of sending the configuration data further comprises sending a RADIUS authentication acceptance response that includes a RADIUS attribute for an attachment identification that indicates both an identification for the particular virtual private network to which the particular interface belongs and an interface identification that uniquely indicates the particular interface among interfaces that belong to the particular virtual private network.

55. An apparatus as recited in claim 50, wherein the configuration data includes a RADIUS attribute for a different node on the edge of the provider network that is different from the particular node and that is included in the particular virtual private network.

56. An apparatus as recited in claim 55, said step of determining whether conditions are satisfied for sending the configuration data further comprising determining whether a RADIUS user authentication request message is received from the particular node, which request includes a RADIUS user name attribute with data that indicates the particular virtual private network.

57. An apparatus as recited in claim 50, wherein the configuration data includes a RADIUS attribute for a tunnel from the particular node to a different node on the edge of the provider network.

58. An apparatus as recited in claim 57, said step of determining whether conditions are satisfied for sending the configuration data further comprising determining whether a RADIUS user authentication request message is received from the particular node, which request includes a RADIUS user name attribute with data that indicates the different node on the edge of the provider network.

59. An apparatus as recited in claim 38, wherein execution of the one or more sequences of instructions further causes the one or more processors to carry out the steps of a Simple Network Management Protocol (SNMP) Server.

60. An apparatus for configuring a network interface on an intermediate network node at an edge of a provider network to support a virtual private network, comprising:
a provider network interface that is coupled to a provider network for communicating therewith a data packet;
a customer network interface for coupling to customer premises equipment outside the provider network for communicating therewith a data packet;
one or more processors;
a computer-readable medium; and
one or more sequences of instructions stored in the computer-readable medium, which, when executed by the one or more processors, causes the one or more processors to carry out the step of:
determining whether conditions are satisfied for configuring a particular interface on the customer network interface for a virtual private network over the provider network;
if it is determined that conditions are satisfied, then sending, to a first server on a first host computer of the provider network, interface identification data that uniquely indicates the particular interface;
in response to sending the interface identification data, receiving from a second server on a second host computer of the provider network configuration data that indicates, for the virtual private network, properties for the particular interface; and
configuring the particular interface for the virtual private network based on the configuration data without human intervention,
wherein
the provider network is a packet-switched network,
the particular virtual private network is a link layer virtual private network, and
the apparatus is different from the first host computer and the second host computer.

61. An apparatus as recited in claim 60, wherein the first server is the same as the second server.

62. An apparatus as recited in claim 60, wherein execution of the one or more sequences of instructions further causes the one or more processors to perform the step of receiving data at the particular node that indicates an address on the provider network for the first server.

63. An apparatus as recited in claim 60, wherein the particular interface is a virtual circuit of a plurality of virtual circuits on the customer network interface.

64. An apparatus as recited in claim 60, wherein the particular interface is the customer network interface.

65. An apparatus as recited in claim 60, said step of determining whether conditions are satisfied for configuring the particular interface further comprising determining whether a particular signal is received on the particular interface.

66. An apparatus as recited in claim 60, said step of determining whether conditions are satisfied for configuring the particular interface further comprising determining whether a message that indicates the particular interface is received from a third server on a third host computer of the provider network, wherein the particular node is different from the third host.

67. An apparatus as recited in claim 60, wherein the first server is a Remote Access Dial-In Service (RADIUS) Server and the second server is the RADIUS server.

68. An apparatus as recited in claim 67, said step of sending the interface identification data further comprises sending a RADIUS authentication request that includes a RADIUS user name attribute with data that indicates at least one of a unique name for the particular interface and a unique name for customer equipment to which the particular interface is directly linked.

69. An apparatus as recited in claim 67, said step of receiving the configuration data further comprising receiving a RADIUS authentication acceptance response that includes a RADIUS attribute for a virtual private network identification that indicates a collection of one or more tunnels for the particular virtual private network.

70. An apparatus as recited in claim 69, said step of receiving configuration data further comprising:
    determining whether the RADIUS authentication acceptance response includes data that indicates a different node at an edge of the provider network; and
    if it is determined that the RADIUS authentication acceptance response does not include data that indicates the different node, then performing the steps of
        sending a RADIUS authentication request that includes a RADIUS user name attribute with data that indicates the virtual private network identification, and
        receiving another RADIUS authentication acceptance response that includes a RADIUS attribute with node identification data that indicates the different node.

71. An apparatus as recited in claim 69, said step of receiving configuration data further comprising:
    determining whether the RADIUS authentication acceptance response includes data that indicates a property of a tunnel from the particular node to a different node at an edge of the provider network; and
    if it is determined that the RADIUS authentication acceptance response does not include data that indicates the property of the tunnel, then performing the steps of
        sending a RADIUS authentication request that includes a RADIUS user name attribute with data that indicates the different node, and
        receiving another RADIUS authentication acceptance response that includes a RADIUS attribute with data that indicates a property of the tunnel.

72. An apparatus as recited in claim 67, said step of receiving the configuration data further comprises receiving a RADIUS authentication acceptance response that includes a RADIUS attribute for an attachment identification that indicates both an identification for the particular virtual private network to which the particular interface belongs and an interface identification that uniquely indicates the particular interface among interfaces that belong to the particular virtual private network.

* * * * *